Feb. 4, 1964    M. B. HALL ETAL    3,120,171
AUTOMATIC STRAPPING MACHINE
Filed Jan. 28, 1958    14 Sheets-Sheet 1
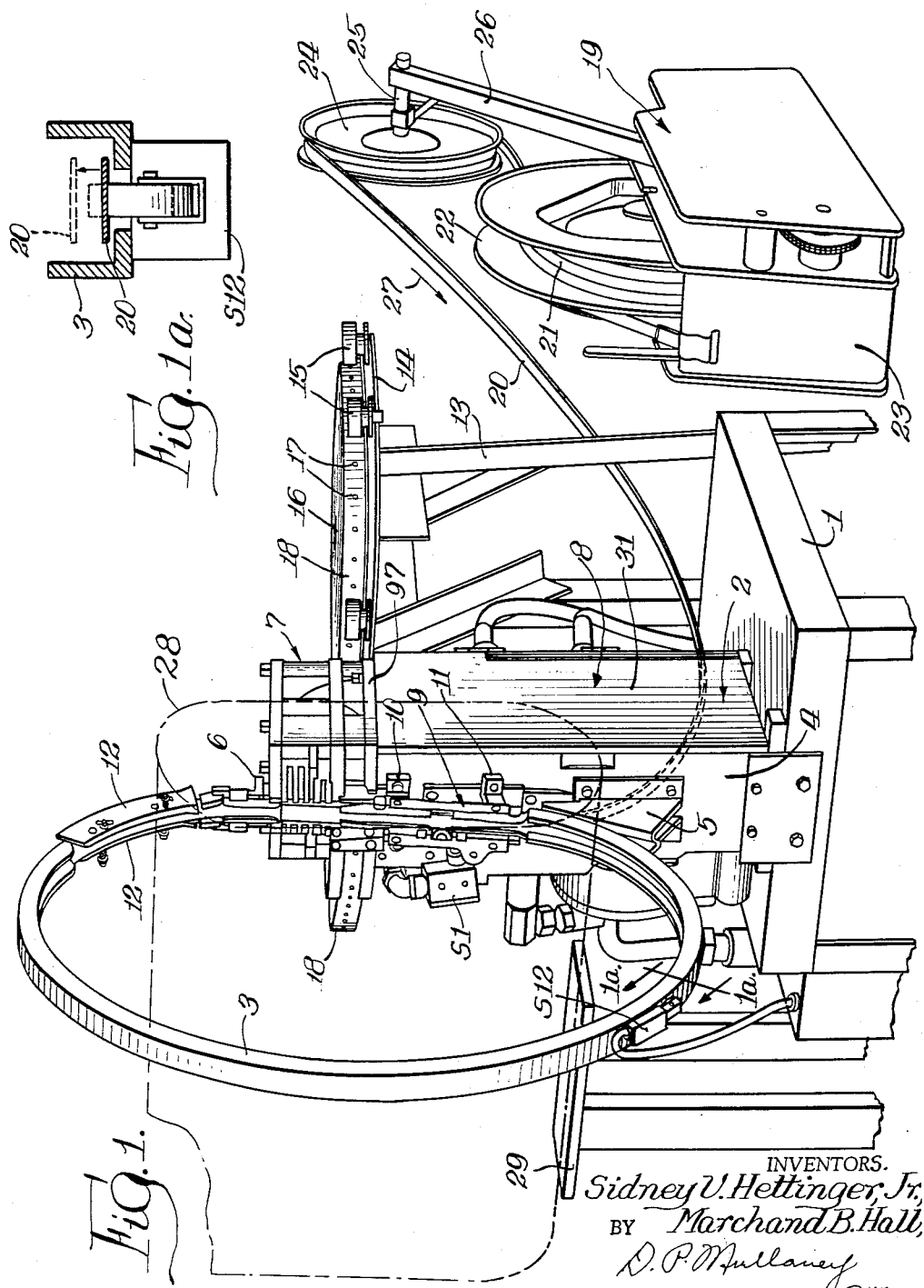
INVENTORS.
Sidney V. Hettinger, Jr.
Marchand B. Hall,
BY D. P. Mullaney
Atty.

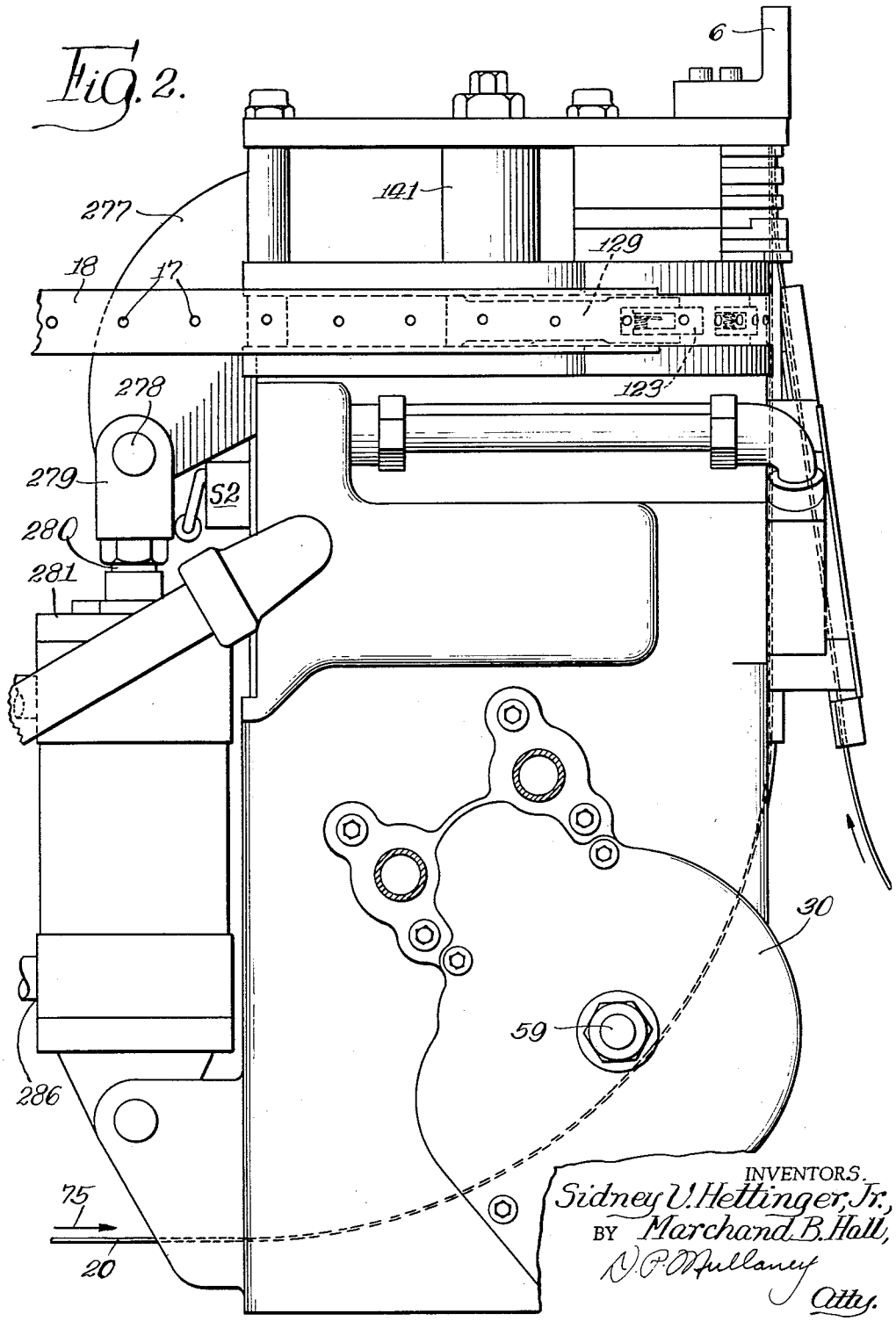

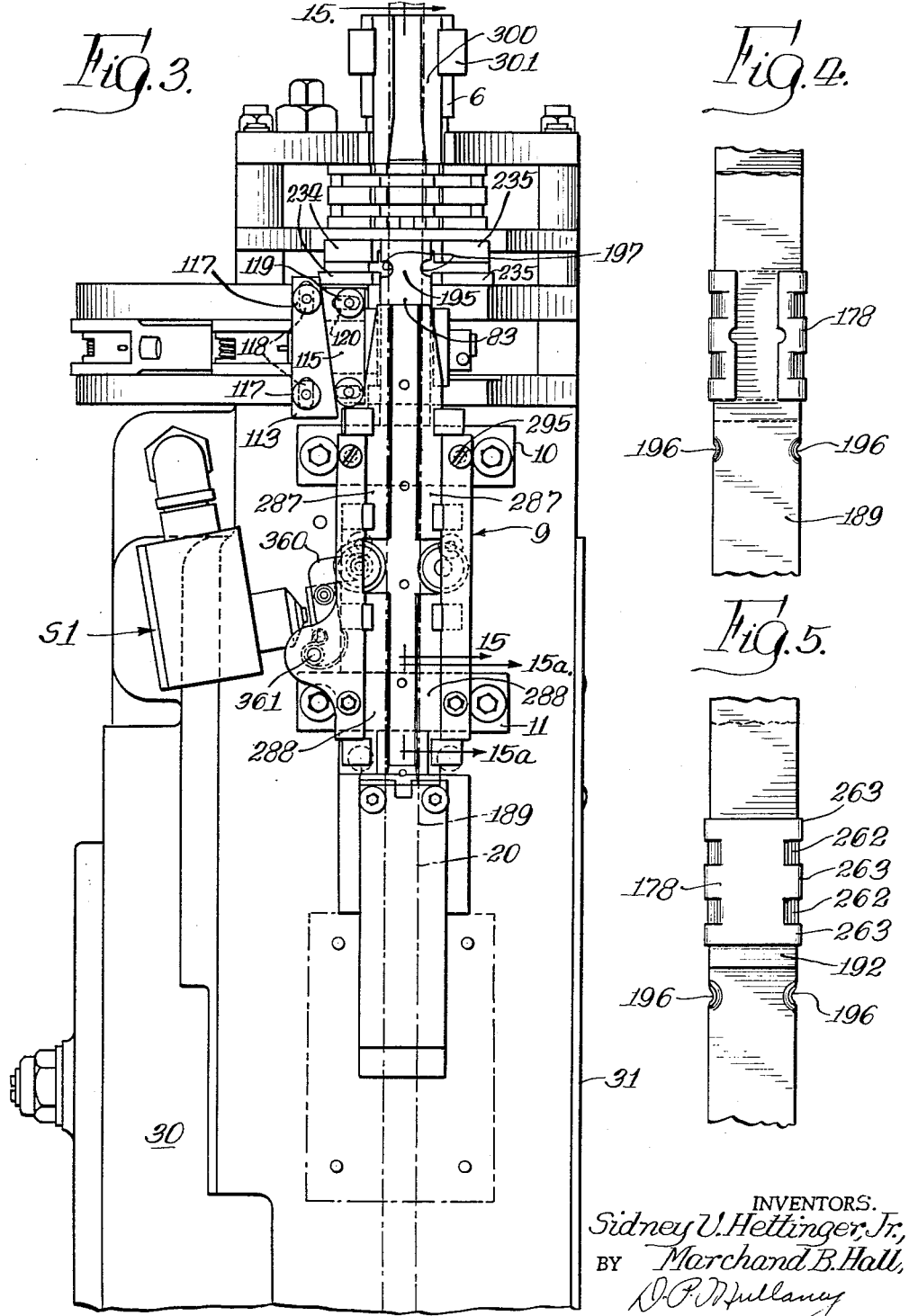

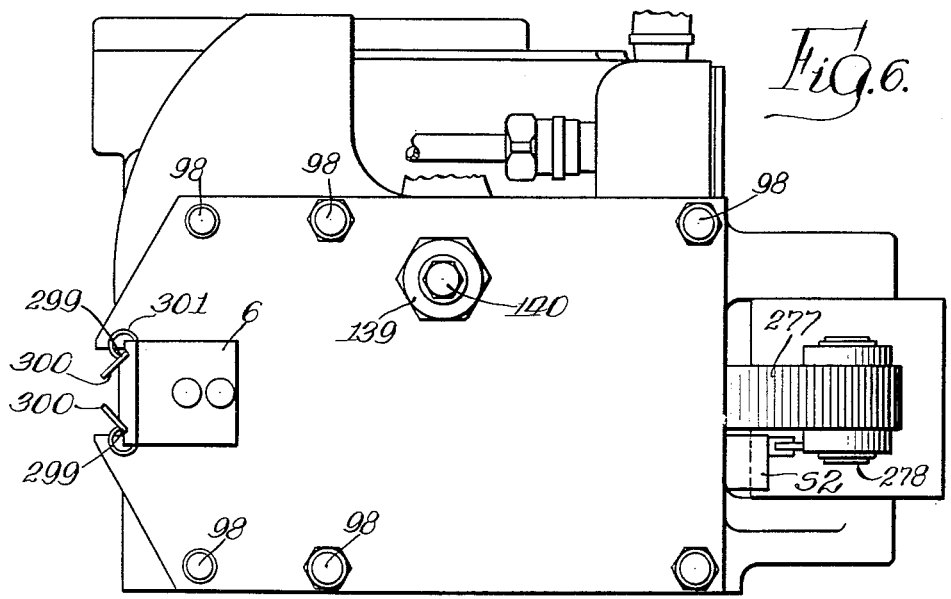
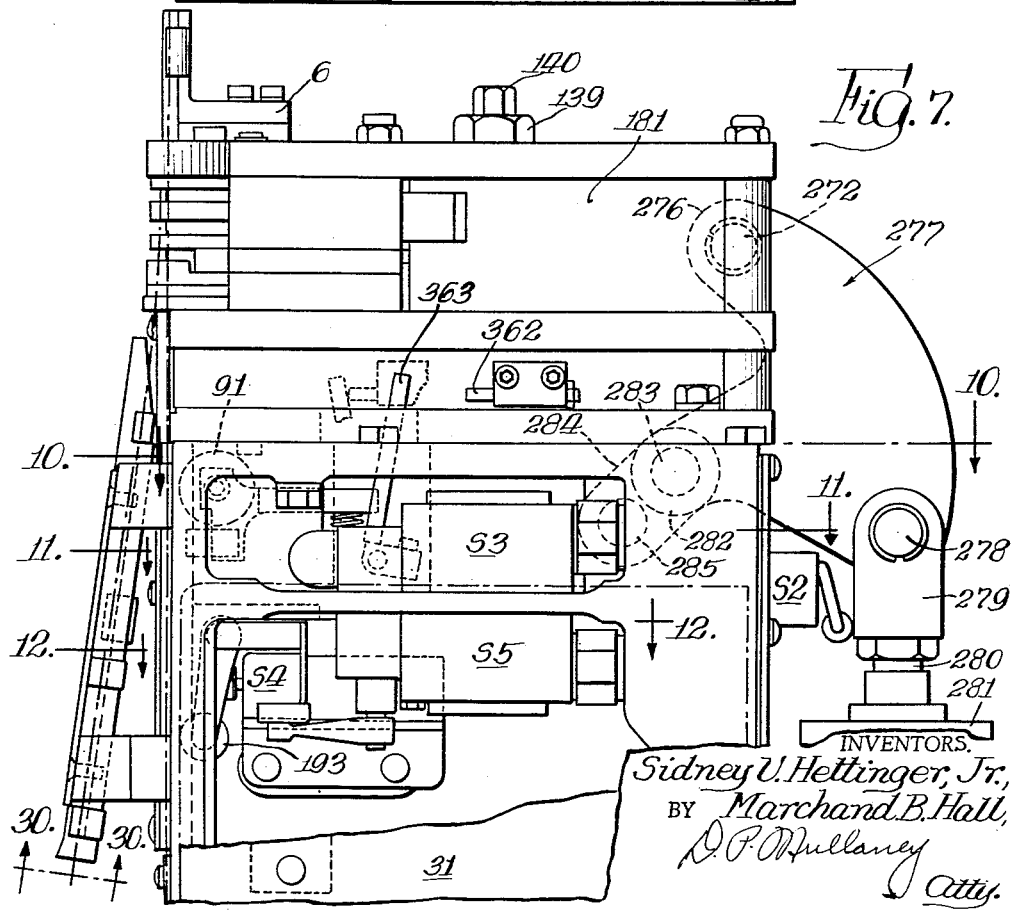

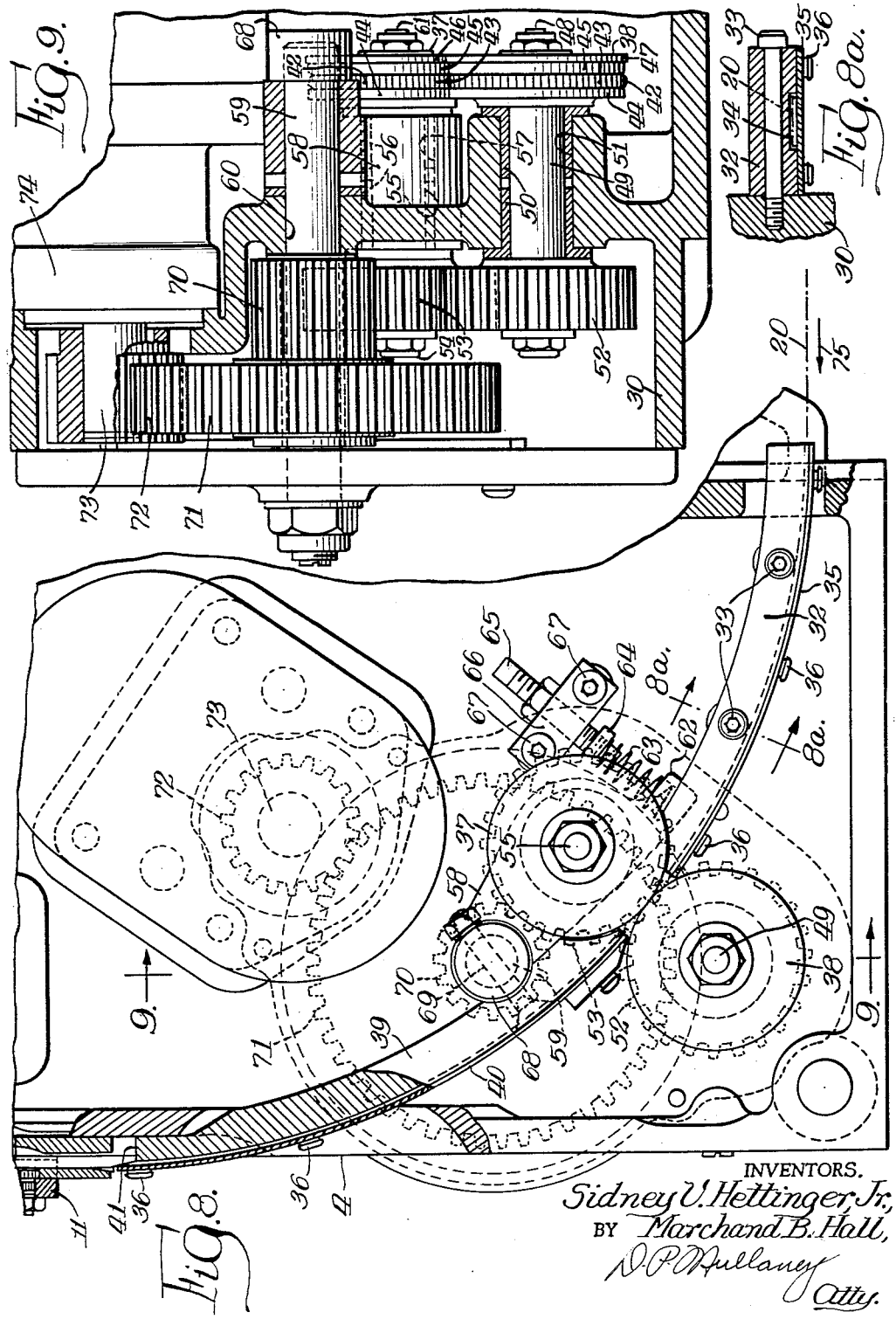

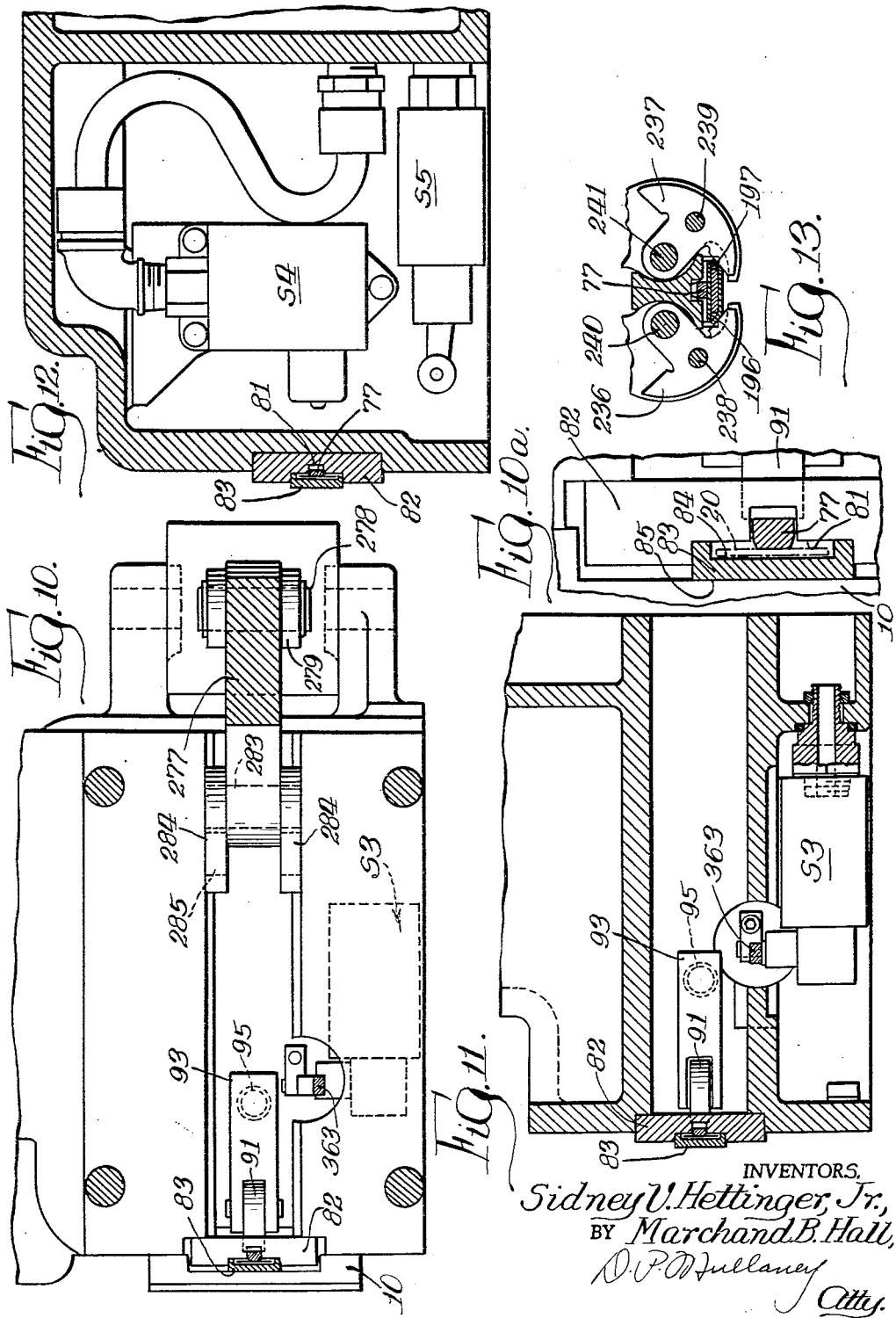

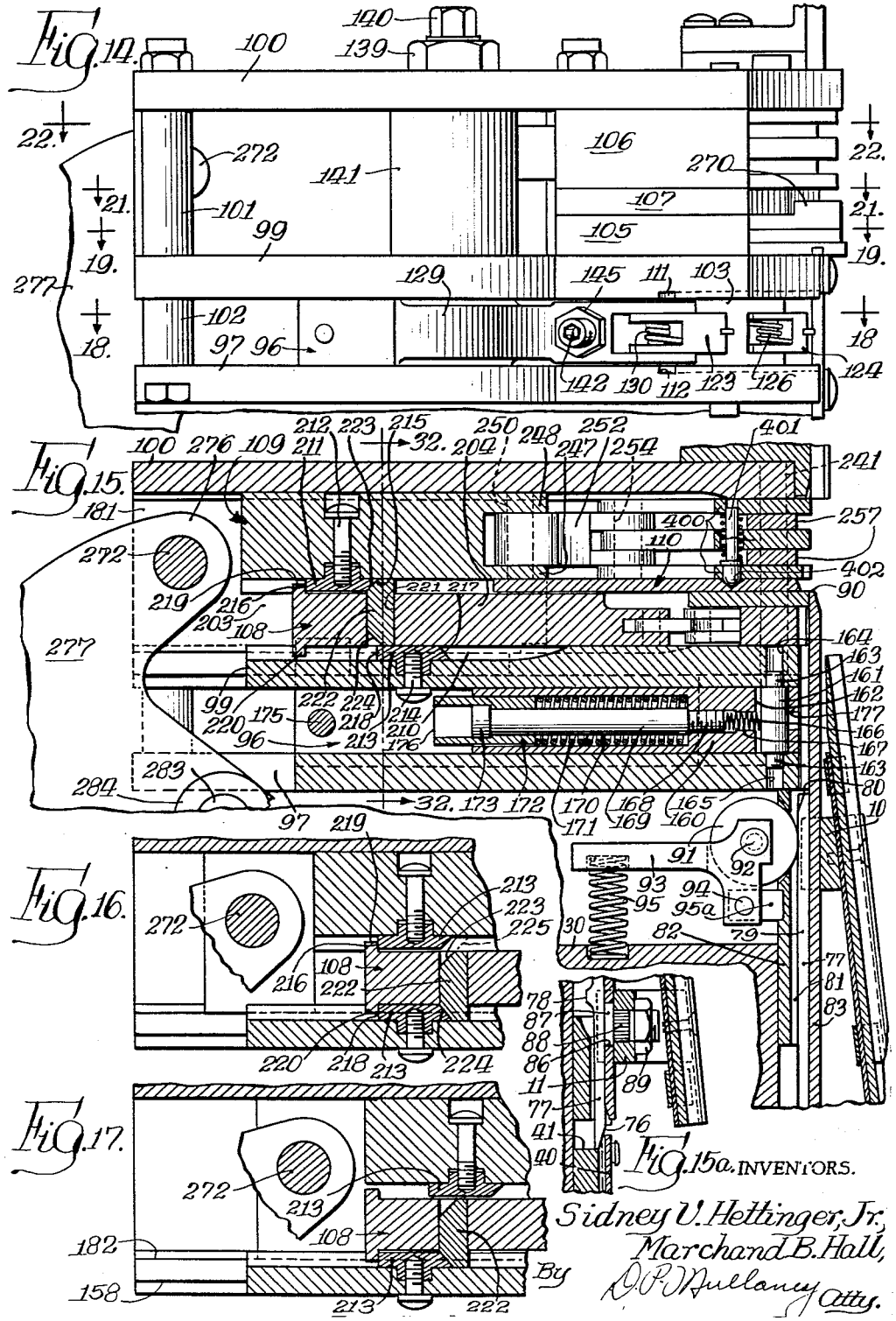

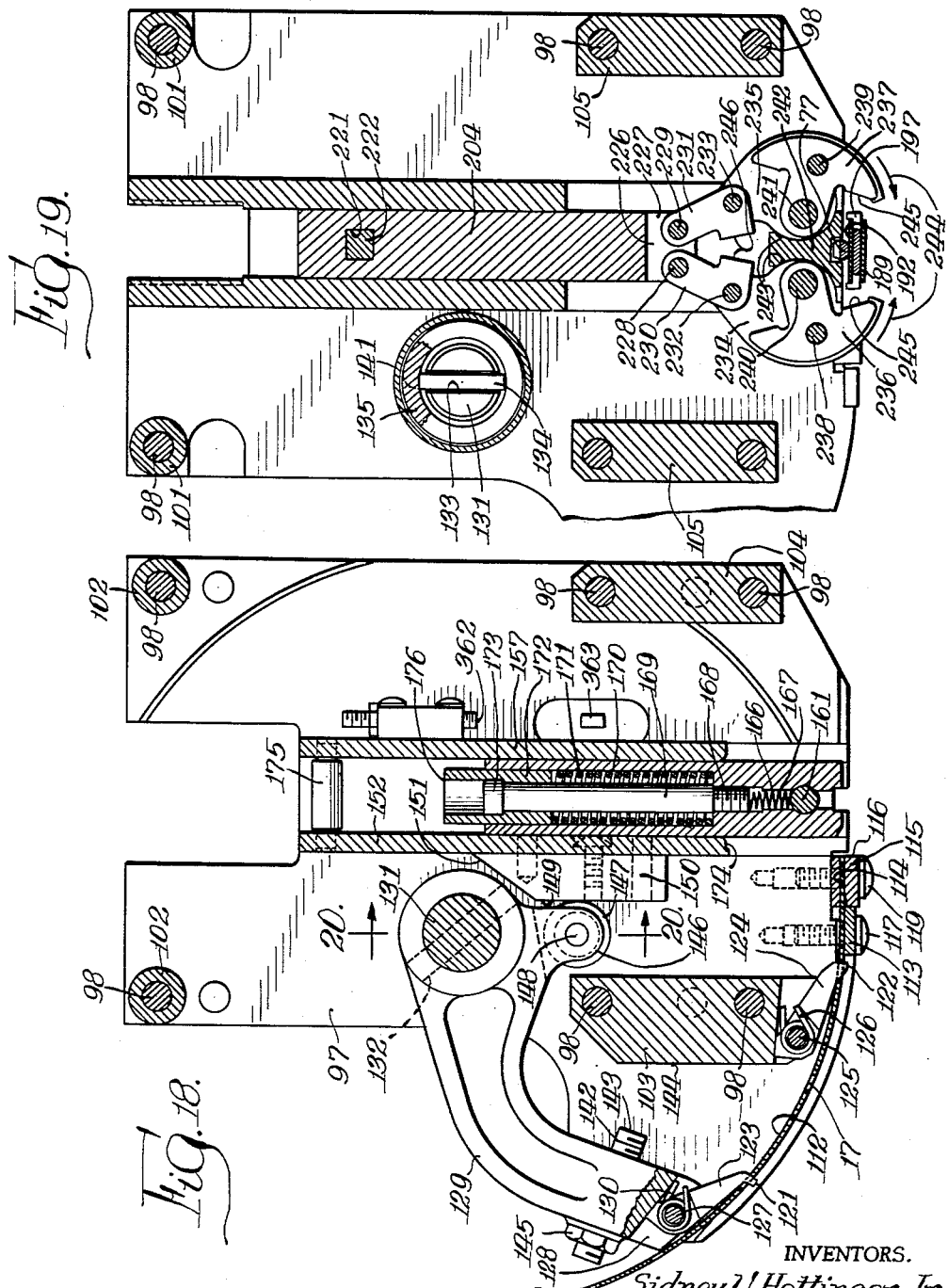

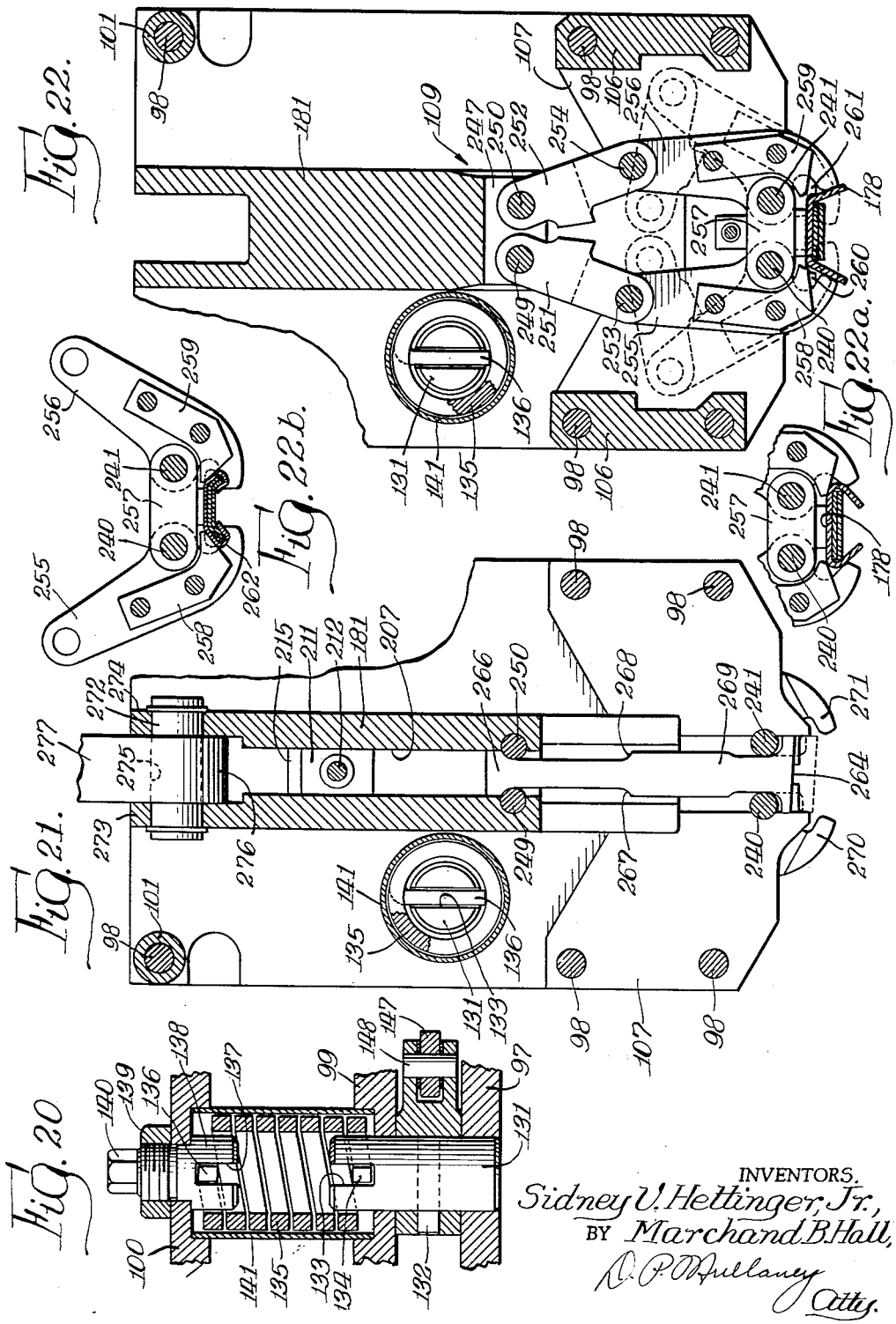

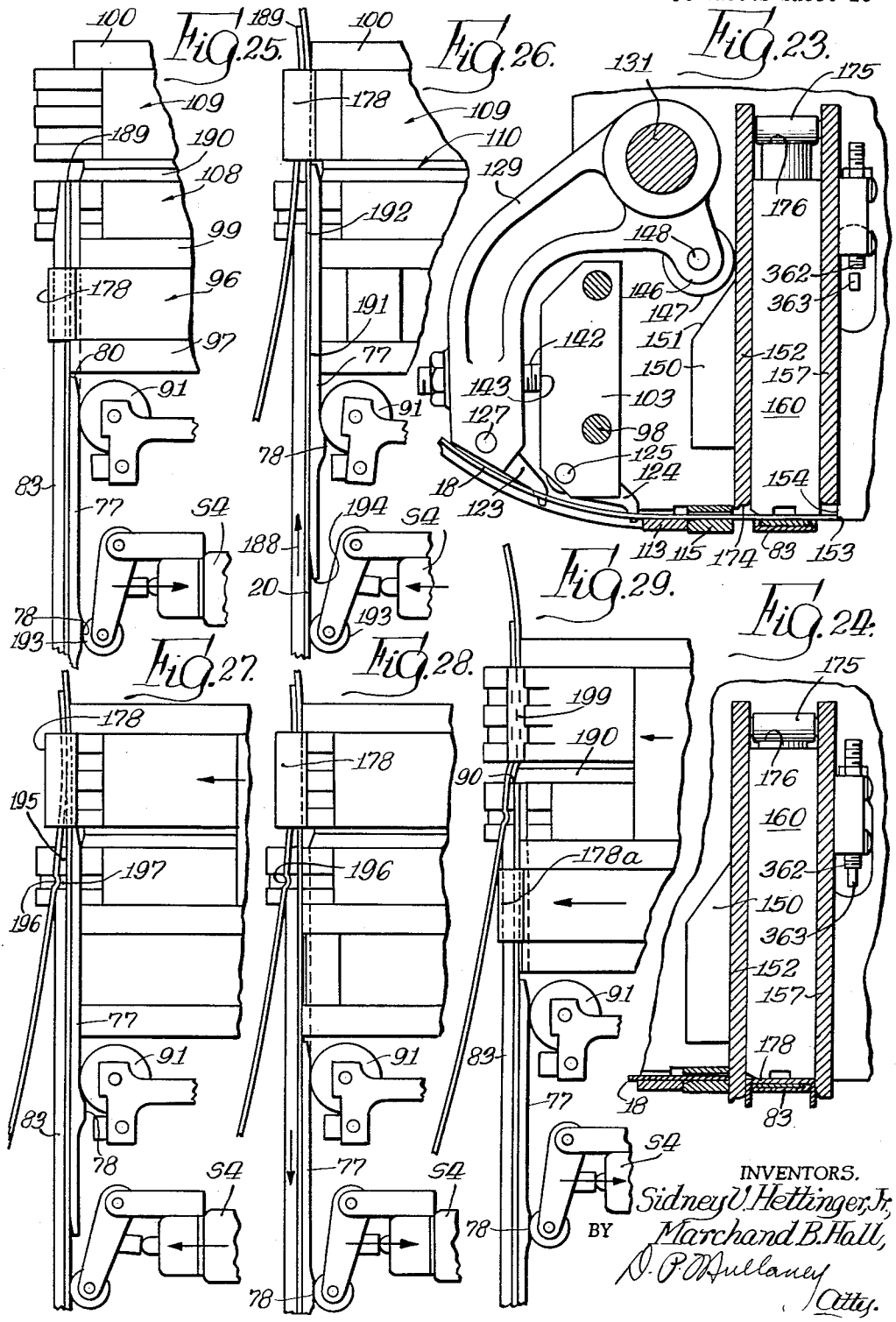

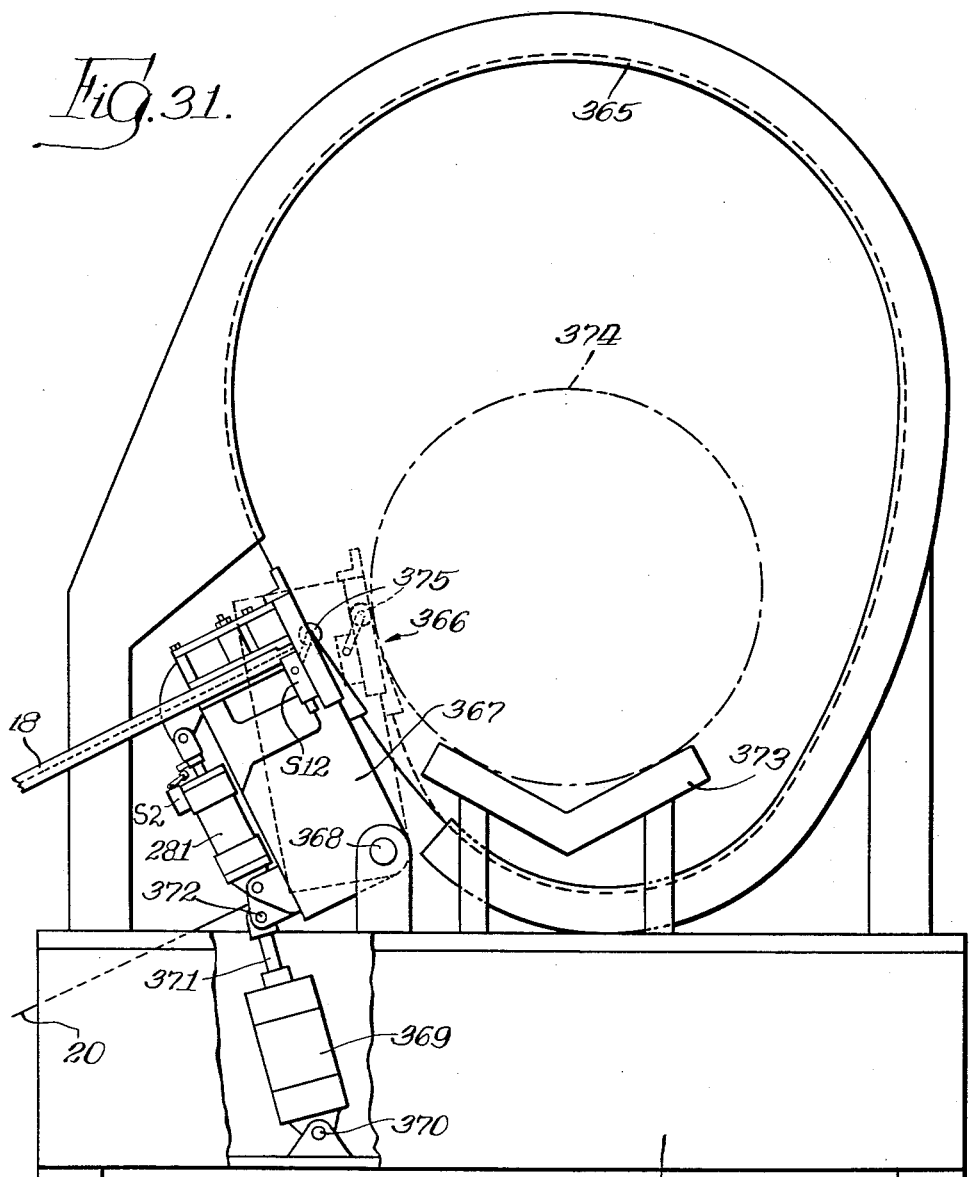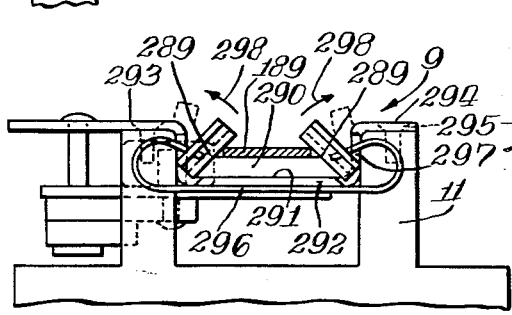

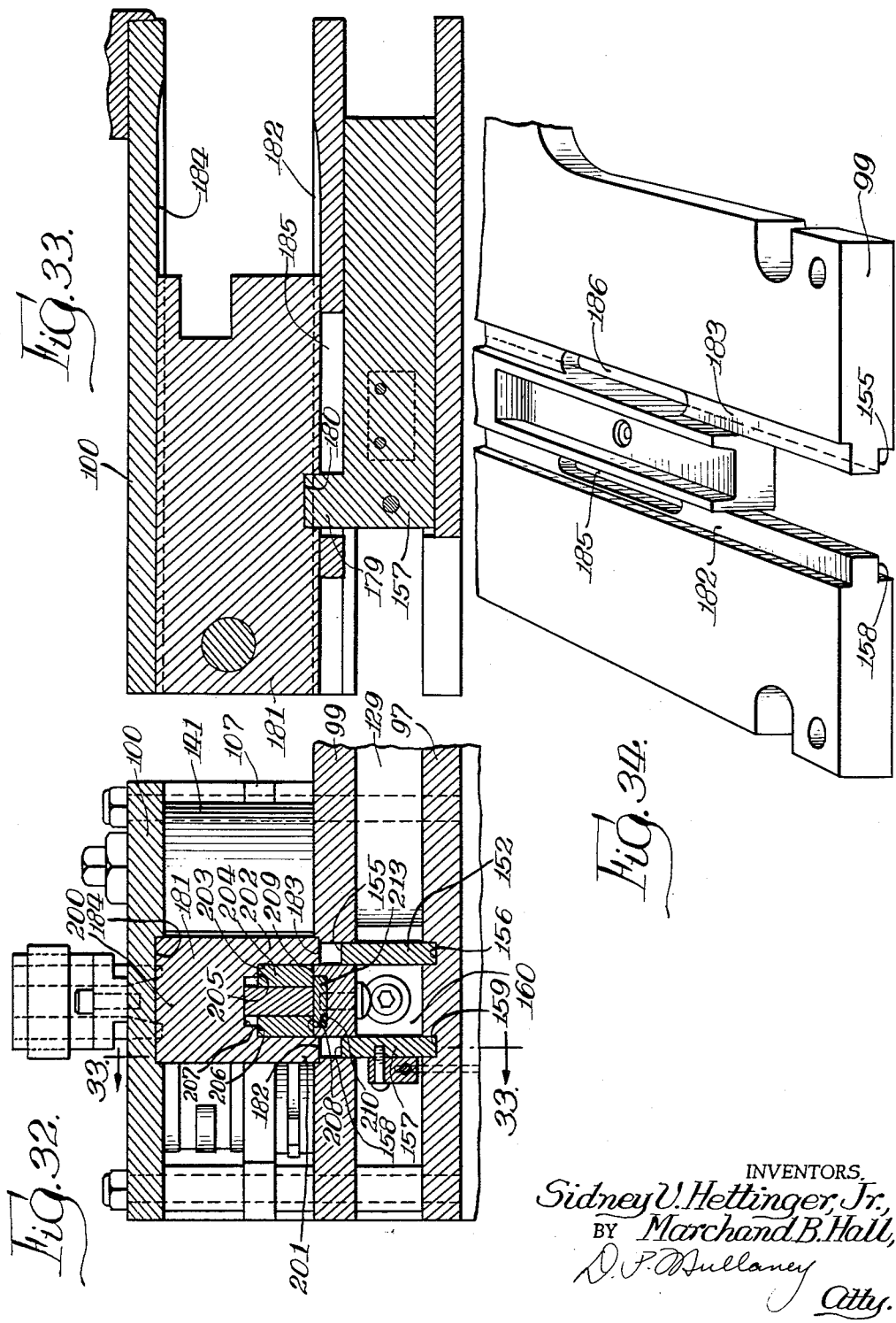

INVENTORS
Sidney V. Hettinger, Jr.,
BY Marchand B. Hall,
D. P. Mullaney
Atty.

INVENTORS.
Sidney U. Hettinger, Jr.,
BY Marchand B. Hall,
Atty.

United States Patent Office 3,120,171
Patented Feb. 4, 1964

3,120,171
AUTOMATIC STRAPPING MACHINE
Marchand B. Hall, Olympia Fields, and Sidney V. Hettinger, Jr., Broadview, Ill., assignors to Acme Steel Company, Chicago, Ill., a corporation of Illinois
Filed Jan. 23, 1958, Ser. No. 711,663
51 Claims. (Cl. 100—26)

This invention relates to improvements in machines for automatically applying metal binding straps about boxes, packages, and other objects.

The principal object of this invention is to provide a more efficient machine of the type mentioned capable of automatically performing all of the steps of partially closing a channel shaped seal and gripping the free end of a length of binder strap held in a closed loop strap guide track encircled around a box or other object to be bound with both the leading end portion and the supply portion of the strap loop extending through the partially closed channel shaped seal in overlapping relation, removing the strap from the track while drawing it taut about the package to be bound, operating a sealing or joint forming device to form a joint between the seal and the enclosed strap portions, cutting off the supply portion of the strap as the joint is completed while at the same time forming a new channel shaped seal for the next sealing operation from flat perforated seal stock supplied from a coil, and then moving the newly formed seal to the sealing position while feeding a new length of binder strap from a source of supply through the channel shaped seal and into the closed loop track to provide a fresh loop of strap of a length sufficient to be extended around another box or object to be bound with the leading end of the strap extending through the newly formed seal in overlapping relation to said supply portion in readiness for the next strapping cycle, the order of steps being capable of certain variations.

It is another object of this invention to provide an improved machine of the type referred to comprising a single actuating means for actuating all of the parts of the machine referred to except those which are required for feeding and tensioning the binder strap and for feeding a newly formed channel shaped seal into sealing position, all of which have separate actuating means.

It is another object of this invention to provide improved means for causing the feeding of a newly formed channel shaped seal from its forming position to its sealing position whereby the seal is fed by a seal feed bar driven by the frictional force of the strap bearing against it while the strap is fed.

It is another object of the invention to provide an improved seal forming means whereby the anvil over which the seal is formed into a channel shape is also used as a guide and backing for the strap and the seal, as a strap gripping element, as well as for a shear blade.

It is still another object of this invention to provide a machine of the type referred to in which all of the operations of the machine are hydraulically powered by means of an improved hydraulic system.

It is another object to provide such a machine in which the tensioning of the strap is performed hydraulically and the amount of tension imparted to the strap is controlled by the adjustment of a pressure relief valve.

It is another object to provide such a strap tension control means in combination with a hydraulically controlled electrical control means which is operated only after the desired tension is reached, and regardless of the setting of the pressure relief valve, the electrical control means being used to initiate the portions of the strapping cycle following strap tensioning.

It is another object of this invention to provide an improved hydraulic means employing a fluid metering cylinder for providing two stage movement of a main hydraulic cylinder in order to sequence the two principal operations of gripping the leading strap end and forming a sealed joint while providing a period between the strap gripping and joint forming operations for tensioning the strap loop on a package.

It is another object of this invention to provide an improved retractable connection mechanism between the driver for the strap joint forming means and the driver for the leading strap and gripping means whereby the driver for the gripping means is driven by the driver for the forming means for only a portion of the stroke of the forming means.

It is another object of the invention to provide an improved means for gripping the leading strap end whereby it is gripped at its sides so as to minimize the space required for strap gripping and to successfully eliminate the conventional reaction surface between the package and the strap loop as ordinarily required on prior art devices. This improvement also eliminates the need for an ejecting means required for ejecting the bound strap loop off of the reaction surface or strap seat as it is commonly referred to.

It is still another object of this invention to provide an improved two stage strap slack take-up embodied in a single means whereby the strap is pulled at high speed with a low force for the initial slack take-up and then pulled at low speed with a high force for final take-up and tensioning, said means being hydraulically powered. This has an advantage of eliminating shock to the machine by the inertia of moving parts by considerably slowing them down before their final stoppage, and permits the use of two pumps, both of small size and power output, one for high speed low force for both strap feed and slack take-up, the other for low speed high force for strap tensioning.

It is still another object of this invention to provide such a hydraulically powered strap slack take-up means whereby the change over from high speed low force to low speed high force can be controlled by (a) the tension reached in the strap while tensioning, or (b) by the strap being pulled out of the track during slack take-up, or (c) in a modified machine, whereby the strapping unit is pivoted relative to the package being bound, by the strapping unit striking the package.

It is still another object of the invention to provide such a hydraulically powered strap slack take-up means embodying adjustable means for causing the change over mentioned at any desired strap tension, as particularly applicable to (a) above.

It is another object to provide an improved linkage between the main actuating means and the parts actuated by it whereby curvilinear motion of the actuating means is translated into rectilinear motion of the actuated parts while moving the actuating means at approximately a right angle to the direction of motion of the parts.

It is another object to provide an improved strap feed mechanism whereby a switch means is operated by the strap end near the end of the strap feed period to initiate an adjustable time delay device which terminates the strap feed as desired.

It is another object of this invention to provide an improved track strap retainer which can be made thin enough to guide the strap end in a confined space closely adjacent to the strapping head at the end of the track to insure the proper overlapping of the ends of a strap loop contained in the track.

It is another object of the invention to provide an improved seal feed means positioned ahead of the region of the joint forming means on the side from which the binder strap is supplied in order to make the strapping head more compact and to eliminate structure on the other side of the joint forming means.

It is another object of the invention to provide an improved gripping means for the leading end of the strap whereby the gripping jaws support the seal forming anvil when the end of the anvil is used as a shear blade and when a seal is formed into a channel shape over it.

Other objects and advantages of the invention will be apparent from the following specifications and the accompanying drawings in which a preferred embodiment is shown. In the drawings, FIG. 1 is a perspective view of a preferred embodiment of an entire strapping machine made in accordance with this invention and is shown with an additional unit, the reel stand, for supplying binder strap to the machine;

FIG. 1a is a sectional view along the line 1a—1a of 1 and shows the position of the switch which can be used for causing the two stage strap slack take-up means to change over from high speed low force to low speed high force;

FIG. 2 is a right side elevation of the strapping machine with the strap track removed and without the seal stock supply tray or the reel stand shown;

FIG. 3 shows a front elevation of the portion of the strapping machine shown in FIG. 2;

FIG. 4 shows a front view relative to its position in the machine of FIG. 3 of a strap joint of a type identical to that which is formed by the strapping machine of this invention;

FIG. 5 shows a rear view of the same strap joint as shown in FIG. 4;

FIG. 6 shows a top plan view of the portion of the strapping machine shown in FIGS. 2 and 3;

FIG. 7 shows the upper portion of the left side of the machine as shown in FIG. 2, but with its left side plate removed in order to show some of the interior mechanisms;

FIG. 8 shows a portion of the left side of the machine as viewed in FIG. 7 and particularly shows the binder strap feed mechanism;

FIG. 8a is a sectional view along the line 8a—8a of FIG. 8 and shows a cross section of the binder strap guide which guides the strap from the source of supply to and from the feed mechanism;

FIG. 9 is a sectional view along the line 9—9 of FIG. 8 and particularly shows the gear train arrangement for driving the bonder strap feeding means;

FIG. 10 is a sectional view along the line 10—10 of FIG. 7 and particularly shows the relation of some of the parts associated with the feeding of a newly formed channel shaped seal which is used to encircle and interlocking engage the overlapping binder strap ends for the formation of a joint;

FIG. 10a is an enlarged portion of the view shown in FIG. 10 and particularly shows enlarged details of the cross section of the anvil, the binder strap and the seal feed bar;

FIG. 11 shows a sectional view along the line 11—11 of FIG. 7 and shows the same approximate members as FIG. 10;

FIG. 12 is a sectional view along the line 12—12 of FIG. 7 and show some of the details shown in FIGS. 10 and 11, but also shows additional switches, one of them being the switch actuated by the seal feed mechanism;

FIG. 13 is a view of the gripping jaws in their extended or gripping positions whereby they have completed forming side indentations or dimples in the leading end of the binder strap for gripping the strap prior to slack take-up and tensioning of the strap;

FIG. 14 is a view of the upper end of the strapping machine shown in FIG. 2, except that no seal stock is shown positioned so that the seal stock feed mechanism is clearly visible;

FIG. 15 is a sectional view along the line 15—15 of FIG. 3 and particularly shows some of the internal portions of the strapping machine associated with gripping the leading strap end, feeding the strap seal, forming the strap seal, forming a sealed joint and shearing the bound loop of strap from the supply portion of the strap;

FIG. 15a is a sectional view along the line 15a—15a of FIG. 3 and is merely a lower extension of the view shown in FIG. 15;

FIG. 16 is a partial sectional view of the mechanism associated with the strap gripping and joint forming mechanism which provides limited travel of the strap gripping mechanism as it is driven by the sealing mechanism. In the position shown, the parts are where they would be at approximately the end of the strap end gripping stroke;

FIG. 17 is a sectional veiw showing the same parts as in FIG. 16 except they are positioned as at the end of the joint forming or sealing stroke;

FIG. 18 is a sectional view along the line 18—18 of FIG. 14 and particularly shows the seal stock feed mechanism, the seal stock shear mechanism and the forming mechanism for the channel shaped seals;

FIG. 19 is a sectional view along the line 19—19 of FIG. 14 and shows the same leading strap end gripping mechanism as shown in FIG. 13 except in a position prior to gripping;

FIG. 20 is a sectional view along the line 20—20 of FIG. 18 of the spring bias means used on the seal stock feed mechanism;

FIG. 21 is a sectional view along the line 21—21 of FIG. 14 and shows the shear mechanism used for shearing the strap loop bound on a package from the supply portion of the strap;

FIG. 22 is a sectional view along the line 22—22 of FIG. 14 and shows the joint forming or sealer mechanism used to deform the overlapping strap ends and an encircling seal into a joint of the type indicated in FIGS. 4 and 5;

FIG. 22a is a sectional view which shows the partially extended positions of the jaws of the sealing mechanism of FIG. 22 in positions corresponding to the end of the strap gripping stroke whereupon the joint forming jaws have partially closed a channel shaped seal around the overlapping strap ends in order to provide the seal as a strap guide;

FIG. 22b is a sectional view corresponding to FIGS. 22 and 22a except that the joint forming jaws are in their completely extended positions after having formed a strap joint of the type shown in FIGS. 4 and 5.

FIG. 23 is a sectional view substantially corresponding to the view shown in FIG. 18 but with the seal stock feed arm positioned at the end of its feed stroke;

FIG. 24 is a view showing a portion of that which is shown in FIG. 23 but, in addition, shows the seal stock shear mechanism and the seal forming mechanism in a position after a channel shaped seal has been sheared into a blank and formed;

FIGS. 25 through 29 show diagrammatically some of the most important functional units of the machine and indicate the sequence of their operation during the steps of feeding the binder strap into the strap track while feeding a channel shaped seal into seal position, gripping the leading end of the binder strap and partially closing the channel shaped seal around the strap to provide it as a strap guide, tensioning the binder strap taut about an object and then forming a joint between the overlapping strap ends and shearing the bound strap loop from the supply portion of strap;

FIG. 30 is a view along the line 30—30 of FIG. 7 and particularly shows the construction of the strap guide and the arrangement of spring loaded clips which are used to retain binder strap in the strap guide;

FIG. 31 is a somewhat diagrammatic view of a modified form of the invention wherein the strapping machine is pivoted on its frame for pivotal movement to and from the object to be bound. This view particularly shows a special switch which is actuated upon contact of the head with the object to be bound, the switch being used for change over from high speed low force to low speed high force as associated with the binder strap slack take-up means.

FIG. 32 is a sectional view along the line 32—32 of FIG. 15 and particularly shows the cross sectional shapes of the drive blocks and the grooves in which they are guided for performing some of the major functions of the machine;

FIG. 33 is a sectional view along the line 33—33 of FIG. 32 and particularly shows the driving arrangement between the slide block used to drive the gripping, the joint forming and the shear mechanism and the slide block used to cut and form channel shaped seals.

FIG. 34 shows a perspective view of the major portion of one of the spacer plates associated with the upper section of the strapping head.

Figure 35:
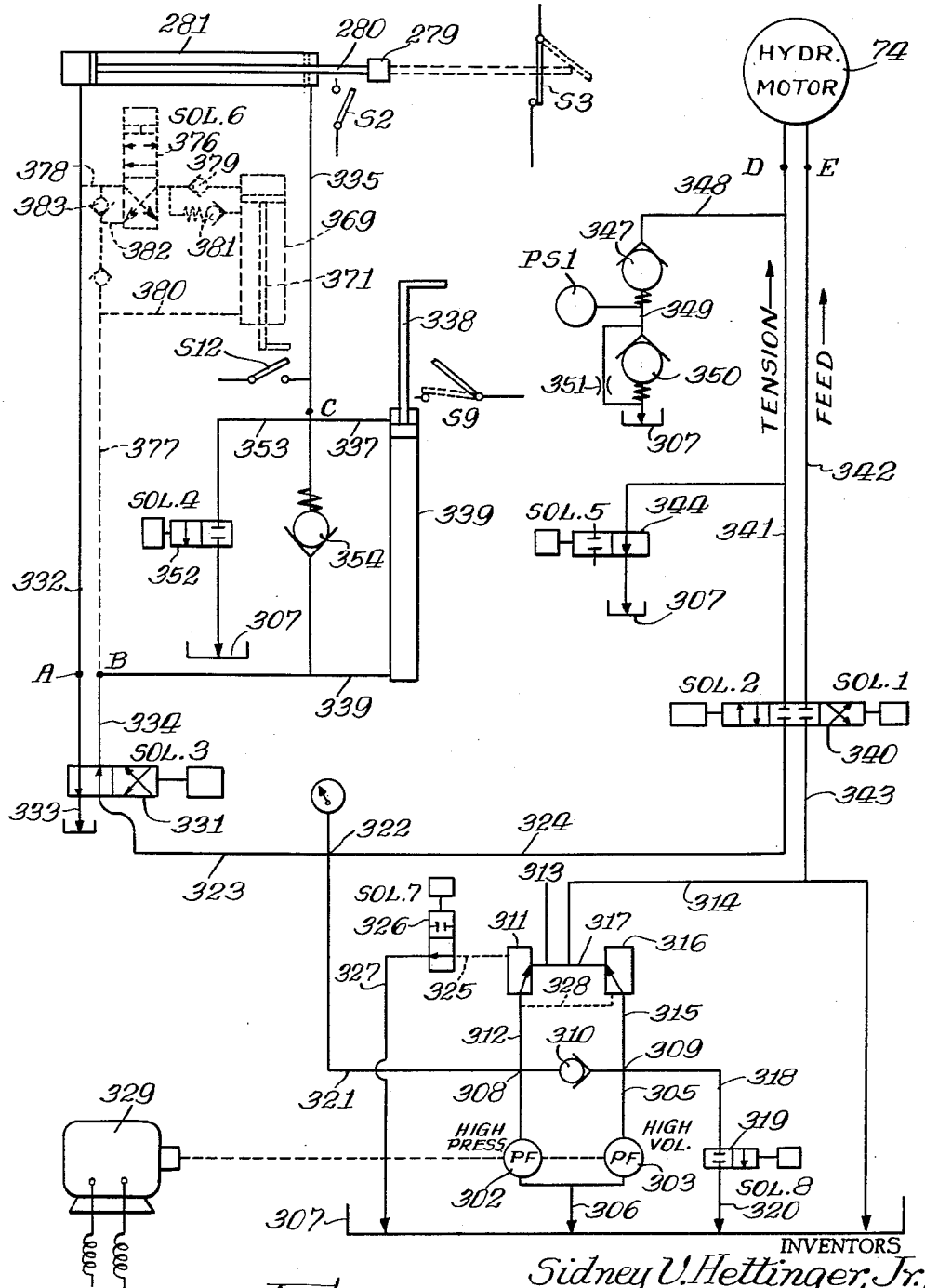

FIG. 35 shows a schematic diagram of the hydraulic system used to operate the strapping machine of this invention.

Figure 36:
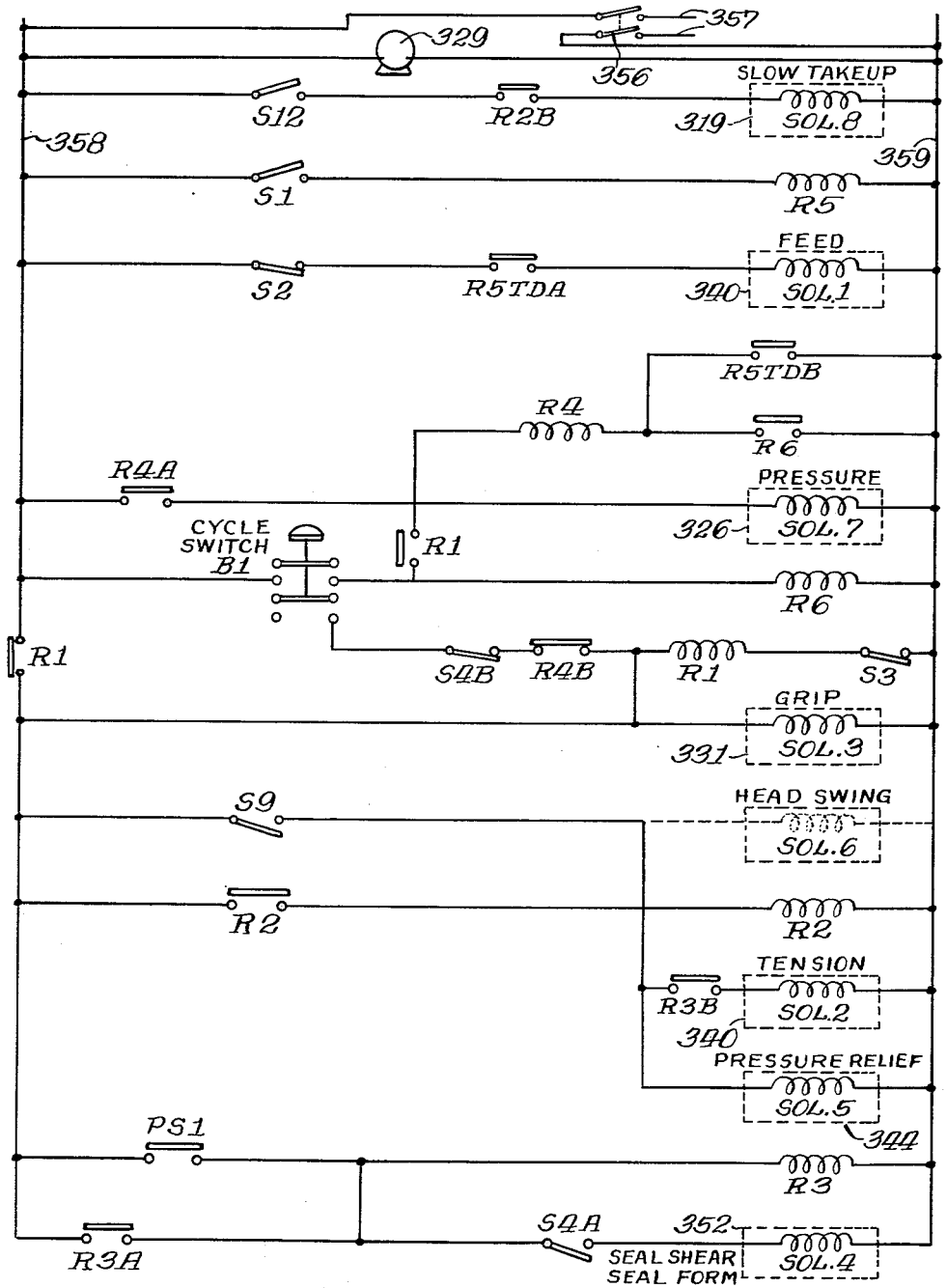

FIG. 36 shows a schematic diagram of the electrical system used to control the operations of the strapping machine.

As shown in FIG. 1, a preferred embodiment of a machine embodying the features of this invention comprises a frame 1 for supporting the strapping machine a suitable distance above the floor. On this frame 1 is supported the strapping head 2 which is bolted to the frame 1 in a suitable position. The strapping head 2 is mounted vertically and is provided with a circular strap track 3 of channel shaped cross section at its forward face 4 by means of a triangular shaped bracket 5 adjacent its lower end and by means of an L-shaped bracket 6 adjacent its upper end. The strapping machine is divided into an upper section 7 and a lower section 8. The upper section 7 consists of the major functional members of the machine which perform the steps of strap gripping, seal stock shearing and seal forming, joint forming and strap cutting, while the lower section 8 houses the binder strap feed mechanism which is responsible for feeding and tensioning the strap and seal feed. In front of the lower section 8 is a strap guide 9 which is fastened by means of two brackets 10 and 11 to the forward face 4 of the strapping machine. This strap guide 9 is the final end of the strap track 3 which leads the leading strap end 189 into overlapping position with the supply strap end 192 adjacent the front face of the upper section 7 of the strapping machine. As will later be described, this strap guide 9 is provided with spring loaded plates which releasably retain the strap within the guide. At the upper end of the upper section 7 of the strap unit, the strap track 3 is provided with spring loaded guides or clips 12 which also releasably retain the strap within the strap track 3. The clips 12 are of a conventional type and form no particular part of this invention as claimed. It should be understood that the strap track 3 may be provided with clips similar to 12 about its entire circumference or at any particular places in case the track is of a size large enough to require them. The particular strap track 3 shown is assumed to be of a sufficiently small diameter that the binder strap, which is initially straight, presses outwardly against the track 3 to keep it retained in the track by its own inherent springness. It should be apparent that, the smaller the diameter of the track, the less requirement there seems to be for auxiliary strap retaining means, such as the clips 12. It should further be understood that it is not necessary to make the strap track 3 of circular shape. It can be made in the shape of an ellipse or other different contours depending upon the dimensions of the packages to be strapped.

Immediately behind the frame 1 on which the strapping machine 2 is supported is another frame 13 on which is supported a circular tray 14 provided with a plurality of rollers 15 mounted on vertical shafts positioned adjacent the periphery of the circular tray 14. The rollers 15, thus being positioned in a circular path, are used to contain a coil 16 of flat strip seal stock so that the convolutions of the coil are prevented from unraveling or enlarging beyond the circumference outlined by these rollers 15. The seal stock is provided with circular perforations 17 equally spaced along its longitudinal center line and these are engaged for feeding by the seal stock feed mechanism contained within the upper sections 7 of the strapping head 2. The seal stock 18 is passed from the outside of the coil 16 around the right side of the strapping head 2 and into the upper section 7, as will later be described, where it is intermittently cut and formed into channel shaped seals. Immediately behind the frame 13 which supports the seal stock coil 16 is the reel stand 19 which may be of any conventional type capable of supplying binder strap 20 as required by the strapping head 2. In this case a coil 21 of binder strap 20 is provided on a reel 22 rotatably mounted on the base 23 of the reel stand 19. A pulley 24 is mounted for free rotation on the end of a shaft 25 at the outer end of an arm 26 whose inner end is pivoted within the base 23 of the reel stand 19. The binder strap 20 is fed off the top of the coil 21 rearwardly beneath the pulley 24 and up around the rear of the pulley and forward of its top in the direction of the arrow 27 where it follows a path to the rear end of the strapping head 2 where it passes into the strapping head 2 and into a feed mechanism as will be described. The strap 20 then follows a path upwardly through the forward face 4 of the strapping head 2 and through the guide formed by the clips 12 and into the strap track 3 where it follows around the periphery of the strap track until the leading end passes through the strap guide 9 and up to the upper end of the upper section 7 of the strapping head 2. With the strap in this position, it is in the form of a loop within the track 3 and the leading end of the strap is then in overlapping relationship with the supply end of the strap 20. With the strap in this position, an object 28 to be bound with the strap 20 may be supported on a table 29 adjacent the right side of the machine, which table may be extended to both sides if desired for convenience. The object 28 is protruded through the opening of the strap guide 3 so that the object intersects the plane of the loop formed by the strap 20. At that time the strap cycle is ready to begin and, as will be described, the operator then presses a cycle switch which will cause the machine to perform all of the required operations as already mentioned to properly bind the object 28 with a taut strap loop. As already mentioned, the strapping head 2 is divided into an upper section 7 and a lower section 8, the lower section 8 consisting primarily of a single casting 30 which is hollowed out as required to house the various units contained within it. It is provided with a single removable side plate 31 secured at its left hand side to provide access to its interior.

As viewed in FIGS. 1, 2, 8, 8a and 9, the strap 20 is fed from a supply coil 21 in the reel stand 19 and into the rear end of the strapping head 2 where it enters strap guide 32 which is fastened by means of two screws 33 to the casting 30 of the strapping head 2. The strap guide 32 is provided with a groove 34 along its lower surface and this groove 34 is rectangularly shaped in cross section and of a size and shape to accommodate the strap 20. A sheet metal cover plate 35 covers the groove 34 to keep the strap 20 retained within the groove 34. The cover 35 is held on by means of screws 36 on either side of the groove 34. The guide 32 extends in an arc to the position of the region where two feed wheels 37 and 38 are in close proximity. Beyond the feed wheels 37 and 38 is another guide 39 which is similar in shape to the guide 32 and also provided with a sheet metal cover 40 similar to cover 35. The cover 40 is also retained by means of screws 36. This guide 39 extends upwardly in a curve and terminates at an end surface 41 adjacent the front surface 4 of the strapping head 2. The feed wheels 37 and 38 are each provided with teeth or transverse serrations 42 along the central regions 43 of their perimeter faces. On either side of the central regions 43 are two smooth surfaces 44 and 45. Adjacent the smooth surfaces 45 are flanges 46 and 47 of slightly larger diameter than the diameter of the wheels at the apices of the serrations 42. The purpose of these flanges 46 and 47 is to keep the serrations 42 on the adjacent feed wheels 37 and 38 separated from each other when no strap is present between them. This insures that the teeth do not grind against each other and cause their destruction.

The feed wheels 37 and 38 are both power driven. The feed wheel 38 is keyed to the outer end 48 of a shaft 49 which is journaled in bushings 50 within an opening 51 in the casting 30. The inner end of the shaft 49 is keyed to a gear 52 having its teeth meshed with teeth on another gear 53 which is keyed to the inner end 54 of another shaft 55 which is journaled in bushings 56 in another opening 57 provided in an arm 58 which is pivoted on a shaft 59 journaled in an opening 60 in the casting 30. The outer end 61 of the shaft 55 supports the feed wheel 37 which is keyed to it. A coil spring 63 reacts between the outer end 62 of the arm 58 and a flange 64 on a screw 65. The screw is mounted and adjustable in block 66 fastened by means of screws 67 to the casting 30 and the screw 65 is adjustable to vary the compression of spring 63 in order to vary the amount of pressure that the feed wheel 37 applies against the feed wheel 38. The outer end of the shaft 59 is prevented from motion to the left by means of an end cap 69 which is held in place by means of a bolt 69. The inner end of the shaft 59 carries a pinion 70 which has teeth engaging the teeth of the gear 53. The pinion 70 is positioned aside a larger gear 71 and is integral with it. The integrated gear consisting of both the pinion 70 and the gear 71 is journaled in bushings to rotate freely on the shaft 59. Another pinion 72 is mounted above the gear 71 and is keyed to the end of a shaft 73 which is driven by a hydraulic motor 74. In order to drive the feed wheels 37 and 38 the motor 74 transmits its force through the pinion 72, to the gear 71, the pinion 70, the gear 53 and the gear 52. This causes rotation of the feed wheels 37 and 38 in opposite directions. The motor 74 is driven in one direction to cause the feeding of strap in the direction of the arrow 75 (FIGS. 2 and 8) and in the opposite direction for strap slack take-up and tensioning. With this arrangement, the feed wheels 37 and 38 are self-energizing against the strap 20 when it is retracted in the direction opposite to that of the arrow 75.

As shown particularly in FIGS. 15 and 15a, after the strap 20 is fed between the feed wheels 37 and 38, it emerges from above the end 41 of the strap guide 39 where it contacts the tapered end 76 of a seal feed bar 77. The seal feed bar 77 is somewhat rectangular in shape as shown in FIGS. 10, 10a, 11 and 12 and it is provided with a projection 78 at the approximate one-third point from its bottom end and its upper portion 79 terminates in a flat end 80. This seal feed bar 77 is guided in a groove 81 provided in a block 82 secured to the front face 4 of the strapping head 2. Adjacent the forward surface of the feed bar 77 is an anvil 83 over which the channel shaped seals are formed. The groove 81 in the block 82 is T-shaped to accommodate the rear portion of the anvil 83 and hold it positioned. The anvil itself is channel shaped by having it provided with a groove 84 to provide an opening through which the strap 20 is passed. The brackets 10 and 11 which are used to support the strap guide 9, as indicated in FIG. 1, are also used to bear against the outer surface 85 of the anvil 83 to hold the anvil positioned within the T-shaped groove 81 of the block 82. This is indicated particularly in FIGS. 10, 10a and 15. The blocks 10 and 11 and the block 82 keep the anvil 83 stationary in any transverse direction. But, in order to keep the anvil 83 fixed in a longitudinal position, the lower end of the anvil is provided with an opening 86 into which is passed the end 87 of a threaded stud 88 held positioned by a nut 89 in an opening in the bracket 11. The hole 86 in the anvil 83 can be transversely elongated and the end 87 of the stud 88 can be eccentric to the longitudinal center of the stud so that rotation of the stud will cause the longitudinal position of the anvil 83 to be varied. As will be later described, the extreme upper end 90 of the anvil is used as a shear blade for shearing the strap loop from the supply portion of the strap.

Adjacent the upper end of the seal feed bar 77, when the seal feed bar is in the position as shown in FIG. 15, is a roller 91 which is journaled on a pin 92 in an L-shaped arm 93. One end of the L-shaped arm 93 is pivoted on a pin 94 to a lug 95a extending from the rear of the block 82. The other end of the arm 93 reacts against one end of a coil spring 95 whose other end reacts against a portion of the frame 30. With this arrangement, spring 95 creates pressure against the roller 91 which is urged in a clockwise direction, as viewed in FIG. 15, against the seal feed bar 77.

After the strap emerges from past the upper end 41 of the strap guide 37 it is forced between the seal feed bar 77 and the anvil 83. As the strap is forced between these two members, the seal feed bar 77 moves toward the left, as viewed in FIGS. 15 and 15a, against the pressure of the roll 91 which also moves the same distance toward the left as the seal feed bar. At this time, during the normal operation of the machine, a seal will have been formed into its channel shape at a point above the end 80 of the seal feed bar 77 by means of the seal forming mechanism 96 at that location.

In order for the machine to form a new channel shaped seal, it must feed the perforated flat seal stock 18 from a source such as the coil 16 mounted on the tray 14, as shown in FIG. 1. The seal stock 18 is fed into the upper section 7 of the sealer head 2 immediately above a spacer plate 97 fastened to the upper end of the lower section 8 of the strapping head 2. This plate 97 is securely fastened to the casting 30 of the lower section 8 by means of suitable bolts 98 which extend upwardly through additional spacer plates 99 and 100 spaced above spacer plate 97. Suitable sleeve type spacers 101 and 102 surround the bolts 98 at the rear end of the strapping head while additional spacer blocks 103, 104, 105 and 106 surround the bolts 98 at the forward end of the head to provide the proper spacing between the spacer plates 97, 99 and 100. In addition, between the spacer blocks 105 and 106 there is an intermediate spacer plate 107. Therefore, with this arrangement of spacer plates, the seal forming mechanism 96 is positioned between the spacer plates 97 and 99 while a strap gripping mechanism 108 is provided between the spacer plates 99 and 107 and a joint forming or sealer mechanism 109 is positioned between the spacer plates 107 and 100. Also the shear mechanism 110 is positioned between the strap gripping mechanism 108 and the joint forming mechanism 109 and the shear blade associated with it is slidable in the intermediate spacer plate 107, as will be described.

The seal forming mechanism is particularly shown in FIGS. 2, 3, 14, 15, 18, 20, 23 and 24. The perforated flat seal stock 18 is led from the tray 14 around the right side of the upper section 7 of the sealer head 2 where it is fed into curved grooves 111 and 112 (FIG. 14) which are cut out of the lower surface of the spacer plate 99 and the upper surface of the spacer plate 97, respectively. The seal stock 18 is then passed behind a wedge shaped plate 113 (FIGS. 3 and 18) and through a slotted opening 114 in a cutter block 115 whose front edge 116 is used as a shear blade for shearing blanks from the seal stock 18. The wedge shaped block 113 is held in place by means of two screws 117 which pass through vertically elongated openings 118 in the blocks so that the block can be shifted through a range of positions vertically. The cutter block 115 is also fastened in place by means of two screws 119 which pass through elongated openings 120 which provide for horizontal shifting of the cutter block 115 so as to permit the proper positioning of the front edge 116 of the cutter block 115. The cutter block 115 is also wedge shaped and bears against the wedge shaped block 113, these mating wedged shapes providing a vernier shifting of the cutter block 115 as the block 113 is moved vertically. As the seal stock 18 is positioned as stated and as shown in FIG. 18, the perforations 17 in the seal stock are engaged by tips 121 and 122 on two pawls 123 and 124, respectively. The pawl 124 is pivoted on a pin 125 secured in spacer block 103 and is urged in a clockwise direction against the seal stock by means of a coil spring 126. This pawl 124 is a check pawl which prevents reverse movement of the seal stock after it is fed into the sealer head. The other pawl 123 is pivotally mounted on a pin 127 which is secured in the free end 128 of a seal stock feed arm 129 and it is also urged in a clockwise direction by means of a coil spring 130. This pawl 123 is the actual seal stock feeding pawl which forces the strip forward into the strapping head as the feed arm 129 is moved in a counterclockwise direction. The inner end of the forward arm 129 is pinned to a shaft 131 by means of a pin 132. The feed arm 129 is positioned between the two spacer plates 97 and 99 and the shaft 131 is journaled in holes in both of these plates. The upper end of the shaft 131 is provided with a diametric slot 133 which is engaged by the lower end 134 of a coil spring 135 whose upper end 136 is engaged in a slot 137 at the lower end of a stud 138. The upper end of the stud 138 passes through an opening in the spacer plate 100 and is secured in a fixed position by means of a nut 139 secured to its threaded upper end. The extreme end 140 of this stud 138 is provided with a hexagonal head to facilitate its rotation in order to adjust the tension of the spring 135. The spring 135 is entirely contained within a cylindrical sleeve 141 which is positioned between recesses in the plates 99 and 100. The spring 135 is wound in such a direction that it urges the feed arm 129 in a counterclockwise direction so that feeding of the shear stock 18 is caused by the force of this spring 135. Adjacent the outer end of the feed arm 129 is a threaded stop 142 having an outer end 143 which engages the surface 144 to limit the travel of the feed arm 129 on its feeding stroke toward the block 103. A locking nut 145 is provided at the end of the stud opposite to 143. Adjacent the inner end of the feed arm 129 is provided a forked projection 146 between which is mounted a roller 147 journaled in a pin 148. The roller 147 is urged by the force of the spring 135 against the outer surface 149 of a block 150. The surface 149 intersects a sloping surface 151 at the inner end of the block 150. The block 150 is fastened to a seal former 152 which is in the form of a flat blade. This seal former 152 is adapted to be reciprocated in a guide, as will be described, so that the block 150 is reciprocated with it. When the former 152 is moved forward from a position as shown in FIG. 18 to a position as shown in FIG. 23, the feed arm 129 is rotated by the force of the spring 135 toward the block 103 to thereby feed the seal stock 18 through the opening 114 in the cutter block 115 until the end 153 of the seal stock strikes surface 154 of the spacer plate 97. When moving from this position, the block 150 is shifted forward to thereby cause the roller 147 to roll down in its incline surface 151 and permit this movement of the feed arm 129. At a later time, after the seal stock has been sheared and a new seal formed, the former 152 is shifted back again to a position as shown in FIG. 18 whereby the roller 147 rolls up the sloped surface 151 and again rests on the flat surface 149. This causes return movement of the arm 129 to its position as shown in FIG. 18. As the feed arm 129 shifts back in this manner, the tip 121 on the pawl 123 is cammed out of the particular perforation 117 in which it happens to be and slides back along the seal stock 18 until the seal arm 129 is in a position where the tip 129 again falls into another perforation 17 in preparation for a new seal feed stroke.

After the seal stock 18 is fed forward to a position as shown in FIG. 23 it is then necessary to shear off a seal blank from the seal stock and form it into a channel shape. With reference to FIGS. 32, 33 and 34 in addition to those last previously mentioned, the former 152 is guided along its upper edge in a groove 155 formed in the lower surface of the spacer plate 99. Its lower edge is guided in another groove 156 formed in the upper surface of the spacer plate 97. Spaced laterally from the former 152 is another former 157 which is similarly guided in grooves 158 and 159 formed in the spacer plates 99 and 97, respectively. Between these formers 152 and 157 is a block 160. As particularly shown in FIG. 15, the block 160 is provided with a circular pin 161 passing through an opening 162 at its outer end. The opening 162 is of larger diameter than the main body of the pin 161 in order to afford free movement of the pin 161 within the opening 162. The ends 163 of the pin are reduced in diameter and fit into openings 164 and 165 formed in the spacer plates 99 and 97, respectively. This pin, therefore, allows only a very small longitudinal travel of the block 160 in an amount equal to the difference in the diameter between the main body of the pin 161 and that of the hole 162 in which it fits. Inward of the pin 161 is a small compression spring 166 which is positioned in a longitudinal opening 167 in the block 160. The spring reacts between the pin 161 and the threaded end 168 of a bolt 169 which is secured in the threaded outer end of the opening 167. The opening 167 enlarges into a larger bore 170 through which the bolt 169 passes and which contains another compression spring 171 encircled about the bolt 169. The spring 171 reacts at its ends against the bottom of the bore 170 and the inner surface of an inner sleeve 172 which is held in place by the flanged head 173 of the bolt 169. With this arrangement, the block 160 is guided longitudinally at its upper and lower surfaces by means of spacer plates 99 and 97 and at its sides by means of the formers 152 and 157. However, its longitudinal movement, as mentioned, is only equal to the difference between the diameter of the opening 162 and the diameter of the main body of the pin 161 and the spring 166 keeps the block 160 ordinarily retracted as shown in FIG. 15. At a later time in the cycle of operation of the machine, both of the formers 152 and 157 are driven forward. As they are driven forward, the feeding of the seal stock occurs as already described and, after a length of seal stock has been completely fed, the end 174 of the former 152 strikes the seal stock 18 and shears a blank from the end of the seal stock as it passes by the cutter block 115 and slides against its end surface 116. This shearing occurs sometime between the positions of parts as shown in FIG. 23 and as shown in FIG. 24. Before shearing occurs, however, a drive pin 175 journaled between the inner ends of the formers 152 and 157 strikes the end surface 176 of the sleeve 172. This urges the block 160 toward the right as viewed in FIG. 15 and downward as viewed in FIGS. 18, 23 and 24 to cause the block 160 to shift toward the pin 161 against the pressure of the spring 166. As this occurs, the end 177 of the block 160 presses against the protruding end of the seal stock 18 and urges it against the anvil 83 to hold the seal stock end clamped prior to shearing it. After it is clamped in this manner, the formers 152 and 157 continue forward as the former 152 shears a seal blank from the seal stock end as described. As the formers continue on in their stroke, they form the severed seal blank into a channel shape seal 178 as shown in FIG. 24. The preloading of the spring 171 between the sleeve 172 and the block 160 actually provides the gripping pressure on the seal stock between the end 177 of the block and the anvil 83.

As best shown in FIGS. 15 and 33, both of the formers 152 and 157 are provided at their inner ends with upwardly extending rectangular projections 179 which engage slots 180 in a block 181. The block 181 is guided in two grooves 182 and 183 provided in the upper surface of the spacer plate 99 and in a single groove 184 provided in the lower surface of the spacer plate 100. The reciprocating movement of the formers 152 and 157, as described, is effectuated by the reciprocation of the block 181 through the interlocked connections of parts 179 and 180. In order for the projections 179 to engage the slots 180 in the block 181, elongated openings 185 and 186 are provided in the spacer plate 99 in line with the grooves 158, 182 and 155, 183.

After a channel shaped seal has been formed, the machine is prepared for positioning the seal in the joint forming position and this machine is adapted to position the seal simultaneously with the operation of feeding the binder strap 20 into the strap track 3. It should be mentioned at this point that the particular cycle of operation described in this application is such that seal forming and binder strap feed and seal feed occur at the end of a strapping cycle. However, there is no reason why the cycle of operation could not just as well be one where it begins with formation of a seal.

In order to more clearly understand what follows, FIGS. 25 through 29 shall be described. These FIGS. 25 through 29 are not intended to be complete structurally but rather are somewhat diagrammatic and are intended only for disclosing the functional features of the machine. In these figures is shown the seal forming mechanism 96, the strap gripping mechanism 108, the joint forming or sealer mechanism 109, the seal feed bar 77, the anvil 83, the roller 91 and a switch S4. After a channel shaped seal 178 has been formed, it is held in a position as shown in FIGS. 24 and 25 against the anvil 83. At this time the seal feed bar 77 is positioned with its upper end 80 immediately below the level of the spacer plate 97. The roller 91 is pressing against the inner surface of the seal feed bar by the pressure of its spring 95 shown in FIG. 15 and it should be noted that this roller 91 always presses against the seal feed bar in this manner through the entire operating cycle of the machine. When the feed wheels 37 and 38 are rotated in a direction by the motor 74 so as to cause the binder strap 20 to feed in the direction of the arrow 75 (FIG. 8) and the arrow 188 (FIG. 26), the strap end 189 which is left positioned from the last operating cycle of the machine immediately at the edge of the shear blade 109 (FIG. 25) is pushed up past the joint forming or sealer mechanism 109 and in and around the strap track 3, the strap guide 9 and into a position just beyond the level of the spacer plate 100 as shown in FIG. 26. During this time the feed bar 77 is also moved upward to feed the seal 178 into a new position adjacent the end of the joint forming mechanism 109. The force causing the seal feed bar 77 to move upwardly is that which is created by friction between the contacting surface in the region 191 between the strap 20 and the seal feed bar 77. The pressure of the roller 91 against the seal feed bar 77 is what creates the frictional force between the strap and the seal feed bar and because the roller 91 is free wheeling, it does not offer any appreciable resistance to the frictional force present in the region 191 so that the seal feed bar 77 is free to move vertically upward with the strap 20. Therefore, as shown in FIG. 26, a strap loop has been formed within the strap guide 3 with the leading end 189 of the strap 20 guided into overlapping relationship with the supply end 192 of the strap 20, and the seal 178 is positioned adjacent the end of the joint forming mechanism 109. As the seal feed bar 77 moves upwardly, the roller 193 of the switch S4 falls off the projection 78 and this opens a portion of the electrical circuit to prevent joint formation until after the seal feed bar 77 is again returned to its original position. Further along, the roller 193 falls off the lower end 194 of the bar 77 and this closes another portion of the electrical circuit to permit strap gripping when the strapping cycle is initiated. After the binder strap 20 has been properly fed to the positions as shown in FIG. 26, the strap gripping mechanism 108 is actuated to grip the leading strap end 189 by gripping its side portions against the upper end 195 of the anvil 83. In so gripping, the strap gripping mechanism causes the edges of the strap end to be provided with indentations 196 on either side of the strap as the strap is forced at these regions into circular recesses 197 at either side of the upper end 195 of the anvil (see also FIG. 3). While the strap gripping mechanism 108 is actuated, the joint forming mechanism 109 is also partially actuated to partially enclose the channel shaped seal 178 above the overlapping strap ends 189 and 192. The seal and strap ends are then in the positions as shown in FIG. 22a. After the steps shown in FIG. 27, the binder strap feed wheels 37 and 38 are reversed in rotation to cause the supply strap end 192 to move in the direction of the arrow 198 in order to draw the strap loop from out of the strap track 3 and pull it taut about the object 28 to be bound. As this occurs the frictional contact in the region 191 between the strap and the seal feed bar 77 causes the seal feed bar to retract to its orignal position as shown in FIG. 28. As the seal feed bar 77 approaches this position, the roller 193 on switch S4 rolls up over the end 194 of the seal feed bar 77 and finally rests on the projection 78 on the seal feed bar 77. As the roller 193 rolls up over the end 194, it re-opens the portion of the electrical circuit previously closed, but, as will be explained, it does not have any effect at this time because of a holding contact within the circuit. However, as the roller 193 rolls upon the projection 78, it closes the portion of the circuit previously opened which allows the joint forming mechanism 109 to be actuated later when a pressure switch is closed. Therefore, as the joint forming mechanism 109 is actuated, it moves forward to form a completed interlocked strap joint 199 between the seal 178 and the two overlapping strap ends. On the same stroke, the seal blade 190 associated with the shear mechanism 110 passes by the extreme end 90 of the anvil 83 to cause the strap loop bound on the package 28 to be severed from the supply portion 192 of the strap 20. Simultaneously with this movement, the seal forming mechanism 96 is actuated to form a new channel shaped seal 178a over the anvil 83 in a manner as previously described. At this point the bound package is removed from within the strap track 3 as the strap 20 is again fed into and around the strap track 3 so that all parts assume the positions shown in FIG. 26 in preparation for a new strapping cycle. Note that the strapping cycle could be set up to begin with parts as shown in FIGS. 25 and 29, but the particular embodiment of the machine described begins its strapping cycle from the positions as shown in FIG. 26 with a new strap loop formed and a new channel shaped seal formed and fed into joint forming position.

After the parts are positioned as shown in FIG. 26, it is necessary to actuate the strap gripping mechanism 108 to grip the leading strap end 189 against the anvil 83. The mechanism for accomplishing this is particularly shown in FIGS. 13, 15, 19, and 32. The block 181 is provided with a main body 200 provided with two depending legs 201 and 202 which are spaced from each other to form a channel shaped groove 203 in which is positioned a block 204. The depending legs 201 and 202 are the portions of the block 181 which are guided in the grooves 182 and 183 formed in the spacer plate 99. The upper portion of the groove 203 is provided with two surfaces 205 and 206 against which the block 204 is also guided. These surfaces 205 and 206 intersect still another channel shaped groove 207 formed at the top of the groove 203. The bottom surface of the block 204 rests on two surfaces 208 and 209 which are parts of the upper surface of the spacer plate 99. Spacer plate 99 is provided with an additional channel shaped groove 210 in between the two surfaces 208 and 209. The groove 207 is provided with a downwardly extending pad 211 which is held in place by means of a screw 212 passing through the main body portion 200 of the block 181 while the groove 210 is provided with an upwardly extending pad 213 which is held positioned by means of a screw 214 secured through the spacer plate 99. The pad 211 is provided with a sloped forward surface 215 and a vertical back surface 216 while the pad 213 is provided with a sloped surface 217 and a vertical back surface 218. In addition, the rear end of the block 204 is provided with an upwardly extending lug 219 and a downwardly extending lug 220. Somewhat forward of the lugs 219 and 220 is a vertical square opening 221 through which is passed a pin 222 provided with two sloped corners 223 and 224. In its operation, the block 204 and the other associated parts of the strap gripping mechanism 108 are positioned as shown in FIGS. 15, 19 and 32. At a time when the machine is to grip the leading strap end 189, the block 181 is moved forward as to the right as viewed in FIG. 15. At this time the forward sloped surface 215 of the pad 211 is in contact with the sloped surface 223 of the pin 222. The pin 222 is then projecting into the region of the groove 207 and is prevented from lowering into the groove 210 because of interference from the pad 213 in its path. As the block 181 moves toward the right, the pad 211 drives the block 204 by means of its contact with the pin 222 so that the block 204 moves in the same direction toward the right of the block 181. This movement of the block 204 continues with the movement of the block 181 until the pad 211 reaches a point where its forward surface 223 reaches position 225, shown in dotted lines in FIG. 16, and occurs when the lug 220 strikes the vertical surface 218 on the pad 213. At this point the pin 222 will have been cammed downwardly by the mating slopes 223 and 215 and permitted to move downwardly as the slope 224 rides down the slope 217. After the position at 225 has been reached, the pad 211 and the block 181 are moved on in their path while a block 204 remains stationary at a position as shown in FIG. 16 because the pad 211 no longer drives the block 204 by means of the pin 222. With the position of the block 204 as shown in FIG. 16, the parts associated with the block 204 have completed the gripping stroke. Movement of the block 181 relative to the block 204 occurs sometime later after tensioning of the binder strap has occurred and when it is desired to form a joint between the overlapping strap ends. When this joint formation occurs, the block 181 moves onward to a position as shown in FIG. 17 free and clear of the stationary block 204. On the return stroke of all the parts, the block 181 is returned to a position as shown in FIG. 16 where the vertical surface 216 of the pad 211 strikes the lug 219. Continued retraction of the block 181 causes the pad 211 to drive the block 204 by means of the lug 219 to its original retracted position as shown in FIG. 15. As this occurs, the mating sloped surfaces 224 and 217 cause the pin 222 to be cammed upwardly again to its position as shown in FIG. 15 in preparation for the next strapping cycle. As particularly shown in FIG. 19, the outer end of the block 204 is provided with a forked end 226 having two ears 227. Mounted between these two ears are two pins 228 and 229 which have pivoted thereon two links 230 and 231 whose lower ends are pivoted on pins 232 and 233 to the upper ends of four gripper jaw holders 234 and 235, there being two of each on opposite sides of the strap gripping mechanism. Between each of the gripper jaw holders 234 is a strap gripper jaw 236 and between the gripper jaw holders 235 is a strap gripper jaw 237 (only one of each of the strap gripper jaw holders 234 and 235 are shown in FIG. 19, but FIG. 3 shows the position of all of them). The gripper jaw holders 234 and 235 are held assembled with their respective strap grippers by means of pins 238 and 239 and both the holders and the jaws are pivoted on pins 240 and 241 secured in holes in spacer plates 99, 107 and 100. Floating between the pins 240 and 241 is a bridge 242 provided with curved side surfaces which engage curved edge portions 243 on the holders 234 and 235. These curved surfaces 243 are eccentric with the center of the pivot pins 240 and 241 so that the bridge 242 is cammed forward as the gripping jaws are rotated toward each other in the direction of the arrows 244. This pivoting of the jaws occurs as the block 204 is driven forwardly as previously described and, when it occurs, the jaws move from a position as shown in FIG. 19 to a position as shown in FIG. 13 whereby the surfaces 245 on the jaws indent the dimples or indentations 196 in the strap against the recesses 197 provided in the anvil. With the gripping jaws 236 and 237 holding the dimpled strap end 189 in this manner, the machine tensions the strap about the package 28. The links 230 and 231 are provided with opposed surfaces 246 which contact each other only as emergency stops to prevent the pins 232 and 233 from going past dead center in case the machine is out of adjustment. Ordinarily the travel of the block 204 is properly adjusted so that these pins 232 and 233 will not go past dead center.

As mentioned, as the gripping jaws are rotated in the direction of the arrows 244, the bridge 242 is moved forward. As it is moved forward, it contacts the raised edges of the channel shaped anvil 83 and prevents deflection of the anvil at a time when gripping occurs. This is to prevent undue stress on the anvil which might otherwise break it. Then after a seal joint is completed, and gripping is no longer required, the jaws are retracted and the curved surfaces 243 on the holders 234 and 235 cause the projection to retract also. It is necessary for the bridge 242 to be retracted in order to permit the feeding of a newly formed channel shaped seal 178 from the seal forming mechanism past the strap gripping mechanism to its position adjacent the joint forming mechanism 109.

Simultaneously with the strap gripping operation, the joint forming mechanism 109 partially forms a channel shaped seal about the overlapping strap ends as shown in FIGS. 22a and 27. The joint forming or sealer mechanism 109 is particularly shown in FIGS. 3, 15, 22, 22a and 22b. The forward end of the block 181 is bifurcated to provide two spaced ears 247 and 248 which are provided with two pins 249 and 250. These pins are connected to the upper ends of two links 251 and 252 whose lower ends are bifurcated and connected by means of pins 253 and 254 to the upper ends of sealer jaws 255 and 256. The lower ends of these jaws are pivoted on the same pins 240 and 241 on which the holders 234 and 235 and the gripping jaws 236 and 237 are pivoted. There are three sealer jaws 255 mounted on the pin 240 and three sealer jaws 256 on the pin 241 and spacing these sealer jaws apart from each other are two links 257. Also, mounted on the lower ends of the sealer jaws 255 are two plates 258 and mounted on the lower ends of the jaws 256 are two more plates 259. The plates 258 and 259 are positioned with projecting ends which are in such a relationship with the outer ends of the jaws 255 and 256 that V-shaped openings 260 and 261 are created. Initially, upon the first movement of the block 181, the sealer parts move from a position shown in FIG. 22 to a position as shown in FIG. 22a whereby the portions of the sealing means in the region of the V-shaped openings 260 and 261 contact the marginal portions of the seal and partially close the channel shaped seal 178 about the overlapping strap ends. On the second movement of the block 181, the sealer parts continue their pivotal movement until they are in position as shown in FIG. 22b. At this point, a strap joint such as is shown in FIGS. 4 and 5 has been formed. The strap joint consists of the seal 178 wrapped around the overlapping strap ends 189 and 192 with tabs 262 cut and bent out of the plan of the portions 263 between and on either side of each of the tabs 262. The reaction of the projecting ends of the plates 253 and 259 is responsible for the tabs 262 while the projecting ends of the sealer jaws 255 and 256 are responsible for retaining the portions 263 in planes parallel to main portions of the strap. Even though a particular form of sealer mechanism has been shown, it is possible to alter the sealer mechanism in any one of many conventional ways to arrive at many other possible types of deformed or interlocking sealed joints without departing from the true scope of this invention. After a sealed joint has shown in FIGS. 4 and 5 has been properly formed as described, the block 181 is retracted and all parts returned to their positions as shown in FIG. 22.

After a sealed joint has been substantially completed, the final movement of the block 181 is used to actuate the shear mechanism 110 in order to cut off the strap loop embodying the sealed joint from the supply end 192 of the strap. Within the groove 207 of the block 181, as shown in FIG. 21, is guided shear blade 190. The portion 265 immediately below the inner end 266 of the shear blade 190 is narrower than its inner end and is of equal width to the spacing of the two pins 249 and 250 which are connected to the block 181 for actuating the joint forming mechanism 109 as previously described. As the block 181 slides forward, the pins 249 and 250 slide along the edges of the narrow portion 265 of the shear blade until they contact curved portions 267 and 268 which curve out to a wider portion 269 of the shear blade 190. By the time the pins 249 and 250 strike the curved surfaces 267 and 268 the joint forming operation has been substantially completed and the pins 249 and 250 then drive the shear blade 190 forward against these curved surfaces 267 and 268 to cause the shear blade to move from its position as shown in solid outline to a position as shown in dotted outline in FIG. 21. The outer end 264 of the shear blade 190 is sharpened and is the edge which coacts with the end 90 of the anvil in order to shear the strap. In order to return the shear blade 190, the pins 249 and 250 return with the return movement of the block 181 until the pins 249 and 250 strike the curved surface adjacent the enlarged end 266 which then causes the shear blade 190 to be retracted. Prior to the time that the shear blade 190 is extended, the gripping jaw holders 234 and 235 are positioned as shown in FIG. 13. The upper most of each pair of the strap gripper holders 234 and 235 are provided with upwardly extending projections 270 and 271 which are held behind the anvil 83 closely adjacent to its extreme end 90 to lend additional support to prevent deflection of the anvil during the time that shearing occurs. Passing through openings in three blocks 400 spaced from each other and adjacent the sealer jaws 255 and 256 is a spring loaded plunger 401 which is urged into a recess 402 in the shear blade 190. This plunger 401 keeps the shear blade 190 positioned as shown in FIG. 15 until the pins 249 and 250 drive it forward.

In brief summary, it should be noted that the movement of the block 181 is responsible for actuation of all of the operations performed by the seal forming mechanism 96, the strap gripping mechanism 105, the joint forming or sealer mechanism 109 and the shear mechanism 110. Movement of this block 181 is through a pin 272 journaled between ears 273 and 274 provided at the rear end of the block 181. The pin 272 is pivoted in a hole 275 and one end 276 of a link 277 (FIG. 7).

The lower end of the link 277 is pivoted by means of a pin 278 to the outer end 279 of a piston rod 280 whose inner end is connected to a piston within a hydraulic cylinder 281. In a region between the pivot pins 272 and 278, the link 277 is provided with a projecting ear 282 which is piovted on a pin 283 to an additional link 284 which in turn is pivoted on pin 285 mounted in the casting 30 of the lower section 8 of the strapping head 2. With this linkage arrangement, as the piston rod 280 is extended by admitting fluid through an opening 286 in the cylinder 281, the end 276 of the link 277 is free to follow the rectilinear path assumed by the pin 272 in the block 181. During this movement, the block 181 is extended to the right as viewed in FIG. 15 to cause all of the operations performed by the block. Upon retraction of the piston rod 280, the link 277 is rotated in the opposite direction to retract the block 181 and return all parts to their positions as shown in FIG. 15. As will be further explained, with respect to the hydraulic system, the extended stroke of the piston rod 280 is divided into two parts. The first part of the stroke corresponds to the movement of the block 181 for causing gripping of the leading strap end and for partially enclosing a channel shaped seal 178 about the overlapping strap ends 189 and 192 while the second part of the stroke corresponds to the remaining movement of the block 181 for causing the formation of a new channel shaped seal and the formation of a joint between the overlapping strap ends and for the shearing of the tensioned strap loop from the supply portion of the strap. Intermediate between the two portions of the stroke is when the strap tensioning occurs.

As viewed in FIGS. 1, 3 and 30, the strap guide 9 which is fastened adjacent the front face 4 of the machine on the brackets 10 and 11 is provided with spring loaded clips 287 at its upper end and similar clips 288 at its lower end for releasably retaining the leading end 189 of the strap 20 which passes through it. The clips are flat plates which rest along sloped surfaces 289 formed at the lateral margins of a bar 290. The bar 290 is riveted to the bottom surface 291 of a channel shaped sheet metal member 292 which has flat and raised marginal flanges 293 and 294 which rest on the upper edges of the brackets 10 and 11 and are fastened thereto by means of four screws 295. Four springs 296 are positioned at spaced intervals along the member 292 and their ends are reversely curled in to a C-shape and pass through side openings 297 in the members 292 to react against the clips to hold them in contact with the inclined surfaces 289. The leading strap end 189 ordinarily rests upon the bar 290 with its edges beneath the clips 289 as shown in FIG. 30. When tensioning of the strap occurs, the leading strap end 178 is pulled out of the strap guide 9 and, as it is, the clips 289 rotate in the direction of the arrows 298 against the pressure of the spring clips 296 to provide clearance for their removal.

Immediately above the top spacer plate 100 is the L-shaped bracket 6 previously mentioned. This bracket 6 is provided with sloped contours 299 along its marginal edges and additional clips 300 rest in contact with these sloped portions 299 by force of an additional spring 301 which is similar in all respects to springs 296 already mentioned. These clips 300 retain the supply end 192 of the strap in the strap guide 3. When the strap loop is shrunk away from the strap guide during the strap tensioning operation, the portion of the strap held by the spring clips 300 is removed from the vicinity of this L-shaped bracket 6 against the pressure of the spring 301.

The entire mechanical construction and operation of a preferred embodiment of the machine having been described, reference will now be made to FIGS. 35 and 36 for a description of the hydraulic and electrical systems for powering and controlling the mechanical operations.

Hydraulic Operation

The hydraulic system for the actuation of all parts of the machine consists of a high pressure low volume pump 302 and a low pressure high volume pump 303 which are connected in parallel hydraulic conduits or lines 304 and 305. These lines connect to a suction line 306 at their inlet sides. The suction line 306 is immersed in a reservoir 307 which holds a supply of fluid to be circulated in the system and which is opened to the atmosphere. The lines 304 and 305, on the outlet sides of the two pumps 302 and 303, are connected to two junctures 308 and 309. Immediately between these junctures is a check valve 310 which checks flow of fluid from juncture 308 to juncture 309. Above the juncture 308 is a pressure relief valve 311 which is connected at its inlet side to the juncture 308 by means of line 312. At its outlet side the pressure relief valve is connected by means of line 313 to another line 314 which leads back into the reservoir 307. Connected to the juncture 309 by means of a line 315 is the inlet side of an unloading valve 316 whose outlet side is connected by means of line 317 to the return line 314. Also connected to the juncture 309 is another line 318 which is connected to a two position solenoid operated valve 319 which in turn is connected to another return line 320 to the tank or reservoir 307. Also connected to the juncture 308 is a pressure line 321 which ordinarily supplies fluid under pressure to distribute it from a juncture at 322 to two lines 323 and 324. Also connected to the pressure relief valve 311 is a bleeder line 325 which connects by way of a two position solenoid operated valve 326 to another return line 327 which leads into the tank 307. Also, connected between the line 312 and the valve 316 is a pilot line 328.

Initially all of the valves and parts to the hydraulic system are positioned as indicated in FIG. 35. When an electric pump motor 329 is started, it rotates the two pumps 302 and 303 by means of a direct drive indicated by dotted line 330. At this time, fluid pumps from the reservoir 307 through both of the pumps 302 and 303. The fluid from the high pressure pump 302 flows through line 304, juncture 308, line 312, pressure relief valve 311, line 313 and line 314 to the reservoir 307. The fluid from the low pressure pump 303 flows through line 305, juncture 309, check valve 310, juncture 308, line 312, pressure relief valve 311, line 313 and to the tank 307 through line 314. At this time fluid from both of these pumps flows under no pressure because the pressure relief valve 311 is maintained open because of the bleeder line 325 being connected directly to the tank 307 because of the position of the solenoid valve 326. The pressure relief valve 311 is of such a design that bleeder line 325 must be blocked before the pressure relief valve acts as a pressure relief valve. As soon as the cycle of the machine is begun, the solenoid valve 326 is operated to a position which blocks bleeder line 325 with the result that the pressure relief valve acts to permit a build-up of pressure in lines 304 and 305. Assuming that the pressure relief valve is set for 1500 p.s.i., the pressure in line 304 builds-up to that pressure and excess fluid pours out of the valve through lines 313 and 314 to the tank 307. Assuming that the unloading valve 316 is set for 500 p.s.i., the pressure in line 305 builds-up to 500 p.s.i. at which time the unloading valve 316 opens wide and dumps the fluid from the low pressure pump 303 to the tank 307 by means of lines 317 and 314. As the fluid is dumped in this manner, the fluid from the low pressure pump 303 no longer flows through the check valve 310. This means that the only fluid reaching juncture 308 at this time is the high pressure fluid from the pump 302 which is pumping at low volume. It should be mentioned that the unloading valve 316 operates at its pre-set pressure of 500 p.s.i. as that pressure is reached in line 312 and transmitted through the pilot line 328 to the unloading valve 316. This means that the unloading valve 316 operates at a time determined by the pressure in the high pressure line 312.

When it is desired to start the operating cycle of the machine, the first operation is the actuation of the cylinder 281 to cause its piston rod 280 to extend through the first portion of its stroke to cause the strap gripping mechanism 108 to grip the leading strap end 189. In order to accomplish this, a cycle switch B1 is closed in order to cause the solenoid 3 of solenoid valve 331 to be energized and connect the pressure line 323 to line 332 and a tank return line 333 to line 334 and solenoid 7 of valve 326 to be energized to block bleeder line 325. As this occurs, pressure builds up in line 321, being limited only by the setting of pressure relief valve 311, as fluid is supplied from both pumps 302 and 303. The piston rod 280 extends as fluid passes out of the rod end of cylinder 281 through the line 335 and into the piston rod end of a metering cylinder 336 by way of line 337. This fluid causes the piston rod 338 of the metering cylinder 336 to retract until it reaches the end of its stroke as fluid flows out of it through the line 339 to the tank 307. The metering cylinder is used to permit a predetermined partial stroke of the piston rod 280 because it displaces a fixed volume of fluid from the cylinder 281. After this amount of fluid is displaced, a projection on the piston rod 338 closes switch S9. Switch S9 is responsible for energizing solenoid 2 of solenoid valve 340 which causes the valve to open the pressure line 324 to line 341 leading into one side of the hydraulic motor 74 and connect a line 342 on the opposite end of the motor 74 to a return line 343 to the tank 307. This causes the motor 74 to be rotated by the pressurized fluid contained in line 324. Simultaneous with the actuation of this valve 340, solenoid 5 of solenoid valve 344 is also actuated to block a line 345 and permit build-up of pressure in line 341. As soon as the hydraulic motor is started, the pressure in line 324 ordinarily decreases due to the lack of resistance immediately, but again builds up as the motor is resisted by the tension in the strap. As long as the pressure is below 500 p.s.i., fluid is operated from both pumps 302 and 303 to provide high volume flow of fluid for rapid strap take-up. As soon as the pressure in line 344 exceeds 500 p.s.i. the low pressure of pump 303 dumps its unloading valve 316 and high pressure with a low volume to the motor results. This automatically slows down the hydraulic motor to prevent an abrupt shock to the machine as full strap tension is approximated. As shown in FIG. 1, a switch S12 may be provided in the track, although it may not necessarily be required. This switch closes when the strap is removed from the track during strap slack take-up. At this time, it causes a solenoid 8 to actuate a valve 319 to provide free flow of the pump 303 through the return line 320 to the tank 307. Therefore, this switch S12 and the solenoid valve 319 further insure that the hydraulic motor 74 is slowed down well before actual high tensioning of the strap begins to further insure that there will be no heavy impact to the machine. This further insurance is ordinarily required in cases where highly incompressible objects are being bound because, after slack has been removed, tension occurs with little additional strap take-up.

As the tension in the strap increases, a certain point is reached which is proportionate to the setting of a pressure relief valve 347 connected in a line 348 joined to line 341. When pressure in line 341 reaches 1000 p.s.i., which may be taken as an example of the desirable pressure to be reached, excess fluid will flow through the pressure relief valve 347 through line 349 where it will build up to a setting on another pressure relief valve 350 which may be approximately 50 p.s.i. As the pressure builds up to 50 p.s.i., in the line 349, it reaches a setting at which the pressure switch PS1 is closed. This switch, for example, may be set for 25 p.s.i. which must be a pressure lower than the setting of pressure relief valve 350. With this arrangement the strap tension can be set to any desired value by adjustment of only the pressure relief valve 347. Even though the pressure switch PS1 is adjustable to operate at different pressures, it need not be readjusted when changing from one tension to another.

When strapping hot coils, the strap expands in length as it heats up. If the joint is formed before the heating and longitudinal expansion is complete, the tension in the resulting bound strap loop diminishes to result in a loose bind. A time delay can be provided to overcome this problem by placing a time delay relay to be actuated by the switch PS1 to thereby delay the action of the sealing operation. If so, pressure switch PS1 would have to be connected in a parallel circuit in series with the relay, rather than where it is shown in FIG. 36. The switch contact of the relay would be replaced in the switch PS1 location as shown.

After the switch PS1 is closed, this in turn starts the second part of the operating stroke of the piston rod 280. In parallel with the pressure relief valve 350 is an orifice 351 which provides a parallel path for fluid from line 341. Sometime later in the operating cycle, as will be described, the pressure in line 341 is blocked and no more fluid will pass through the pressure relief valve 347. At this time, the pressure in line 349 will drop as fluid passes through the orifice 350 to the tank 307 and, as the pressure falls below the 25 p.s.i. setting of switch PS1, it resets itself by opening in readiness for the next operating cycle.

After the desired tension in the binder strap has been reached, the closing of switch PS1 causes de-energization of solenoid 2 of valve 340 and energization of solenoid 4 of a valve 352. De-energizing solenoid 2 positions valve 340 so that both lines to the motor 74 are blocked. This means that tension may be held in the strap since no fluid is permitted to flow either way through the motor 74. Energizing solenoid 4 of valve 352 opens line 335 to the tank 307 by way of line 353. This immediately causes the piston rod 280 of the cylinder 281 to extend to the end of its stroke. This second portion of movement of the piston rod 280 causes the operation of the joint forming, strap shearing and seal forming mechanisms 109, 110 and 96, respectively. At the end of the stroke of the piston rod 280, switch S3, is opened. This causes de-energization of solenoids 3, of solenoid valve 331 to cause extension of piston rod 338 of the metering cylinder 336 as fluid under pressure flows into the cylinder through the line 339 and out of it to line 325 to the cylinder 281. Switch S3 also de-energizes solenoid 4 to actuate valve 352 and block line 353. At the end of the stroke of the piston rod 338, pressure in the line 339 builds up to a pressure beyond the setting of a pressure relief valve 354, which may be set, for example, at 200 p.s.i., at which time fluid flows from line 339 through the pressure relief valve 354 to the cylinder 281 by way of line 335 to cause complete retraction of the piston rod 280. Retraction of this piston rod 280 causes return of the mechanisms used for joint forming, strap sealing and seal forming.

When all of these mechanisms have been returned because of the retraction of piston rod 280, a switch S2 is closed by the piston rod 280 to cause reversal of the flow of fluid through the motor 74 as solenoid 1 of valve 340 is energized. This reversal of the motor 74 causes feed wheels 37 and 38 to feed in a new length of binder strap 20 and, simultaneously with it, the newly formed seal is fed from the seal forming position to its position adjacent the joint forming mechanism. This seal feeding is caused by the motion of the seal feed bar 77 as previously described. As the seal feed bar is moved, switch S4 is actuated to close switch contacts S4B and open switch contacts S4A. Closing these contacts prepares the circuit for the next strapping cycle. As the strap approaches the end of its feed, the strap end actuates, i.e. opens, stop feed switch S1 thereby de-energizing relay solenoid R5 which after a time delay, causes solenoid 7 of valve 326 to again be opened to the tank 307 by way of line 327. This opens bleeder line 325 to the tank so that the valve 311 moves to a wide open position. This relieves the pressure in the system as both pumps 302 and 303 dump fluid under no load condition through the then open pressure relief valve 311 to the tank 307 through line 314. Simultaneously with the de-energization of solenoid 7, solenoid 1 of valve 340 is also de-energized. This blocks the flow of fluid to the hydraulic motor 74 to stop it and thereby arrest the strap feed.

It should be noted that all parts shown above the points A, B, C, D and E are contained within the strapping unit as previously shown and described. All parts shown below these points may be contained in a separate hydraulic unit embodying all of these standard parts and hydraulic couplings need only be supplied at these points mentioned. Therefore, none of these parts below these points are shown in the first 34 figures.

*Electrical Operation*

The electrical system for the machine is shown schematically in FIG. 36. It consists of a master switch 356 which connects a source of voltage 357 to two main conductors 358 and 359. Between these conductors 358 and 359 all electrical components of the machine are connected. All of the solenoid valves shown in FIG. 35 are also shown with their respective solenoids in FIG. 36. In addition, relay solenoids R1, R2, R3, R4, R5 and R6 are shown along with the respective switch contacts that they open and close. Solenoid R1 actuates contacts R1A and R1B, solenoid R2 actuates contacts R2A and R2B, solenoid R3 actuates contacts R3A and R3B, solenoid R4 actuates contacts R4A and R4B, solenoid R5 actuates contacts R5TDA and R5TDB while solenoid R6 actuates contacts R6A. All of these relay solenoids mentioned are spring return so that the contacts which they actuate are returned to either the opened or closed positions as indicated in FIG. 36 when they are deenergized. Similarly all of the solenoid valves 319, 326, 331, 340, 344 and 352 are spring return type valves which upon deenerization return to positions as indicated in FIG. 35. Also, FIG. 36 shows all of the other switches used on the machine which are shown physically positioned on the strapping head 2 in the drawings or else schematically in FIG. 35, or in both places.

Before the beginning of a strapping cycle, the master switch 356 is closed. This supplies voltage to the electric motor 329 to cause it to rotate the two hydraulic pumps 302 and 303. At this time, the machine ordinarily is in a condition whereby a loop of strap is encircled in the strap track 3 with its two ends 189 and 192 overlapping each other with all parts in a condition as shown in FIG. 26. In order to start a strapping cycle, the cycle switch B1 is closed. This causes relay solenoids R1 and R6 to be energized. This closes relay contacts R1A, R1B and R6A. Closing contacts R1B energizes valve solenoid 3 to cause the piston rod 280 of cylinder 281 to partially extend and cause the leading strap end 189 to be gripped. Closing contacts R1A energizes relay solenoid R4 through closed contact R6A. Energizing relay solenoid R4 closes its contacts R4A and opens R4B. Opening contacts R4B does nothing at this time, but prevents a recycle of the machine in case cycle switch B1 is depressed again. Closed contacts R4A energize valve solenoid 7 and cooperate with contact R1A to maintain relay solenoid R6 energized. Valve solenoid 7 is responsible for permitting pressure to buildup in the system as described and is energized simultaneously with valve solenoid 3 to provide pressurized fluid for the gripping stroke.

At the end of the strap gripping stroke, the piston 338 on the metering cylinder 336 closes switch S9 to cause the energization of relay solenoid R2 and valve solenoids 2 and 5. Energizing relay solenoid R2 closes its contacts R2A and R2B. R2A is a holding contact in a series with contact R1B for maintaining relay solenoid R2 and valve solenoids 2 and 5 energized. Closed contact R2B prepares the valve solenoid 8 circuit for later energization when switch S12 is closed. Energizing valve solenoid 2 begins tensioning by operating valve 340 to a position which causes rotation of the hydraulic motor 74 in the direction to rotate the feed wheels 37 and 38 in a tensioning direction. Energizing valve solenoid 5 actuates valve 344 to block line 345 which is a parallel return to the tank. Blocking line 345 is required so that tensioning pressure can be built up.

As tensioning of the binder strap 20 begins, switch contact S4B of switch 4 opens as its roller 193 climbs onto the end 194 of the seal feed bar 77. This indicates that the seal feed bar is not in final seal feed position and prevents strap gripping at the start of the next cycle until the seal feed bar has again moved another seal to joint forming position and S4B is again closed. Contact S4A closes when it climbs the hump 78 on the seal feed bar 77 to indicate that the seal feed bar has been retracted far enough to pickup a newly formed seal at the end of the cycle and permits the subsequent energization of valve solenoid 4 by a pressure switch PS1 when the desired strap tension is reached.

As tensioning proceeds, the loop of the binder strap 20 is pulled from the track and this causes switch S12 which is located in the track as viewed in FIGS. 1 and 1a to energize valve solenoid 8 to open line 318 to the tank 307 and thereby dump the flow from the low pressure pump 303 to slow down the final portion of the tensioning operation. This leaves only the force of the high pressure pump 302 and its low volume for operation of the motor 74. Of course, as previously described, when strapping compressible packages, switch S12 may not be required. If so, then switch S12, contact R2B and solenoid 8 can be eliminated from the electrical circuit. In that case, at 500 p.s.i., valve 316 will dump pump 303 for high tension, as previously described. A switch S1 which is located to be actuated by a roller carrier arm 360 pivoted on a pin 361 to a strap guide 9 is also closed as the strap is pulled out of the track and the arm 360 pivots to the right as shown in FIGS. 1 and 3. Closing switch S1 causes relay solenoid R5 to be energized to close its relay contacts R5TDA and R5TDB. Contact R5TDA prepares the valve solenoid 1 circuit for later energization when switch S2 is closed. Contact R5TDB keeps relay solenoid R4 energized to in turn keep its contact R4A closed after switch S3 opens later. Contact R5TDB will therefore keep valve solenoid 7 energized at that time to maintain pressure in the system for return of the piston rods 333 and 280 and for strap feeding.

When the desired tension in the binder strap 20 has been reached, as determined by the setting of the pressure relief valve 347, as already described, a delay occurs as pressure builds up in line 349 until the pressure switch PS1 is closed by this build-up in pressure to cause valve solenoid 4 and relay solenoid R3 to be energized. Energization of valve solenoid 4 opens valve 352 to connect line 353 to the tank 307. This relieves pressure on the cylinder 281 to cause its piston rod 280 to complete its stroke and cause sealing, shearing and seal formation. Energizing relay solenoid R3 closes its holding contact R3A and opens its contact R3B. Opening contact R3B de-energizes valve solenoid 2 to cause valve 340 to return to a position which blocks flow of fluid to both sides of the motor 74 and thereby prevent further rotation of the feed wheels 37 and 38 after shearing of the binder strap 20 occurs. Blocking of the motor 74 is important at this time, for if tensioning pressure is maintained in the motor 74 at this time, upon shearing of the binder strap, the supply strap end 192 would be withdrawn out the rear end of the strapping head 2. This would necessitate rethreading of the machine and an interruption of the operating cycle.

After sealing, or joint formation, shearing and seal formation have been completed on the forward stroke, an adjustable projection 362 fastened to the side of the former 157 of the seal forming mechanism 96 strikes (FIGS. 7, 10, 11, 18, 23 and 24) the arm 363 of the switch S3 to open the switch S3 and cause the deenergization of relay solenoid R1. De-energizing solenoid R1 opens its contacts R1A and R1B. Opening contact R1A de-energizes relay solenoid R6 which opens its relay contact R6A which effects nothing at this time because contact R5TDB maintains the relay solenoid R4 energized to in turn keep the valve solenoid 7 energized to maintain fluid pressure. Opening contact R1B de-energizes valve solenoids 3, 4, and 5 and relay solenoids R2 and R3. De-energizing valve solenoid 3 positions solenoid valve 331 such that fluid flow to the cylinders 281 and 336 causes the piston rod 280 to be retracted and the piston rod 338 to be extended. De-energizing valve solenoid 4 blocks fluid flow in the return line 353 to permit pressure to be built-up in line 335 as required for the proper return of the piston rods 280 and 338. De-energizing valve solenoid 5 opens the solenoid valve 344 to provide a full parallel flow path for the motor 74 to eliminate any reverse movement of the hydraulic motor which would possibly cause retraction of any positioned seal upon reverse movement of the binder strap at the end of the strap feed upon the abrupt blocking of the lines 341 and 342 to the hydraulic motor by actuation of the valve 340. Without such an arrangement, upon blocking of the valve 340, it has been found that the hydraulic hose represented by line 341 expands while the hose represented by line 342 contracts slightly by the inertia of the motor and the fluid in the system. The effect of this would be that the motor would reverse slightly in order to balance out this expansion and contraction condition in both of the lines 341 and 342, with the result that the strap would be reversed to cause the retraction of the seal as mentioned. De-energizing relay solenoid R2 opens holding contact R2A and also contact R2B. Opening contact R2B de-energizes valve solenoid 8 to actuate solenoid valve 319 and block the flow to the tank 307 through the line 318. This causes the low pressure pump 303 to again operate in parallel with the high pressure pump 302 as controlled by the pressure relief valve 311 to make the full volume of both pumps available for strap feeding. De-energizing relay solenoid R3 opens holding contact R3A and closes contact R3B to prepare the circuit for the next cycle.

At the start of the return stroke of the piston rod 280 used for sealing, shearing and seal formation, the projection 362 on the former 157 of the seal forming mechanism 96 permits the spring return of the arm 363 to cause switch S3 to be closed again in preparation for the next strapping cycle.

At the end of the retraction stroke of the piston rod 280, the outer end 279 of the piston rod 280 strikes a roller on switch S2 to cause S2 to close and start strap feed by energizing valve solenoid 1 of the valve 340 which supplies fluid under pressure in the proper direction to motor 74.

Prior to the end of strap feed, the leading strap end 189 strikes the roller on the arm 360 to cause switch S1 to open. This de-energizes relay solenoid R5 to permit opening of its contacts R5TDA and R5TDB after a time delay inherent in the relay. The reason for the time delay is to maintain valve solenoid 1 energized to keep the motor 74 under pressure for the approximate final strap feed increment and to maintain valve solenoid 7 energized to keep the pressurized fluid available to the motor for this feed increment.

At the end of the delay, contacts R5TDA and R5TDB both open. Opening R5TDA de-energizes valve solenoid 1 to block the valve 340 to the motor 74. Opening contact R5TDB de-energizes relay solenoid R4 to open contact R4A and de-energize valve solenoid 7 to shut off pressure in the system by causing both pumps 302 and 303 to dump to the tank 307 through the then open pressure relief valve 311 by way of line 314. During this strap feed movement, the seal feed bar has again been fed forward to cause the switch contact S4A to again be opened and the switch contact S4B to again be closed in preparation for the next strapping cycle. Although switch S4 has been described as one whereby its contact S4A is actuated by the action of switch roller 193 with the projection 78 on the seal feed bar 77 and contact S4B is actuated by the action of roller 193 with the end 194 of the seal feed bar 77 so that contacts S4A and S4B are actuated at different times. A switch is available on the market which is actuated by a different movement in opposite directions. Such a switch can be used to operate contacts S4A and S4B simultaneously. Its characteristics are such that both contacts are actuated in one direction only after the roller 193 moves the total travel from the top of the projection 78 and falls off the end 194 of the seal feed bar 77, and are actuated in their opposite direction, not in response to the end 194, but only as the roller 193 is again moved atop the projection 78.

As already described for the first embodiment for the machine shown in all of the figures except FIG. 31, the slack take-up and tensioning has occured in two stages. The first stage occurs as full flow from both pumps 302 and 303 is supplied to the hydraulic motor 74 which provides high volume of fluid for fast strap take-up. As the strap loop formed in the track 3 is diminished in size as it is being contracted onto the package 28 being strapped, it is pulled out of the strap track 3 to cause switch S12 to be closed. When this switch S12 is closed, it energizes valve solenoid 8 to reposition the valve 319 and open the line from the low pressure pump 303 to the tank 307. This immediately shuts off the high volume flow from pump 303 as a supplement to the flow from pump 302 to the motor 74 and this immediately decreases the speed of the motor to slow down the strap tension speed. Immediately thereafter, the full tension is reached without an abrupt impact on the hydraulic system and parts of the machine. Therefore, in the first embodiment there is shown and described a two stage tensioning system whereby the tension in the strap itself or, as an alternate, contraction of the strap loop initiates the second stage of tensioning.

A second embodiment of the machine is shown somewhat diagrammatically in FIG. 31. The second embodiment consists of a frame 364 which supports a circular channel shaped track 365 which is provided with a gap 366 into which is positioned a strap head 367 of the same basic construction as the strapping head 2. However, this strapping head is pivoted on a pin 368 to the frame 364 as shown and is provided with an additional positioning cylinder 369 whose lower end is pivoted on a pin 370 to the frame 364. The piston rod 371 of the cylinder 369 extends upwardly to where it is pivotally fastened on a pin 372 at the rear lower portion of the strap head 367. Adjacent the upper end of the strapping head 367 is the switch S12 which is a switch equivalent to the switch S12 of the first embodiment as shown in FIGS. 1 and 19. Even though located differently, its electrical function is identical. Supported within the opening of the strap track 365 is a V-shaped package support 373 upon which a package or object 374 to be bound is positioned. In operation, the piston rod 371 of the cylinder 369 is adapted to be extended simultaneously with strap take-up or tensioning. Switch S12 is located as shown in FIG. 36 so that when it is closed it starts the second stage of strap tensioning as described for the first embodiment. However, with this second embodiment shown, the roller 375 for actuating the switch S12 does not cause it to close until it strikes the object 374. Ordinarily, with this arrangement the cylinder 369 can be of such a size that it will cause the roller 375 to strike the object 374 before tensioning is completed. Consequently, as the roller 375 does strike the object 374 the second stage of tensioning begins by slowing down strap take-up.

As shown in dotted lines in FIG. 36, the valve solenoid 6 for energizing the valve 376 which causes the proper flow of pressurized fluid to the cylinder 369 is energized simultaneously with the beginning of the tensioning as switch S9 associated with the metering cylinder 336 is closed.

The cylinder 369 and its associated valve 376 and other hydraulic parts are shown in dotted lines in FIG. 35. At a time after the leading strap end has been gripped and tensioning is to begin, the solenoid 6 of valve 376 is energized simultaneously with solenoid 2 of valve 340. This actuates valve 376 to direct fluid flow from line 323 through the valve 331 to line 332, to a line 378, a valve 376, a valve 379 and into the piston end of cylinder 369. Fluid then flows out of the rod end of the cylinder 369 through lines 380 and 377 to return to the tank 307 through the valve 331. Upon the subsequent de-energization of solenoid 3 of valve 331 which is simultaneous with the de-energization of solenoid 6 of valve 376, the metering cylinder piston rod 338 is extended and the piston rod 280 is retracted to retract all parts of the strapping head. After the piston rod 280 has been entirely retracted and the sealer jaws and strap gripping members are no longer gripping, the piston rod 371 of cylinder 369 then starts to retract after pressure builds up to a point determined by the setting of a spring loaded check valve 381 at which time the fluid flows out of the piston end of cylinder 381, the solenoid valve 376, the line 382, the check valve 383, the lines 378 and 332, through the valve 331 to the tank 307 through line 333. The pressure setting of valve 380 must necessarily be higher than that of valve 354 in order to insure that piston rod 371 retracts last; otherwise, the gripping jaws might still be gripping. Thus, what has been described is an alternate embodiment of the invention in which a movable or pivotal head is used for convenience in binding different size packages 374. When so using a movable or pivotal type head, the switch S12 can be actuated in response to contact of its roller 375 against the object in order to start the second stage of strap tensioning. This manner of initiating the second stage of strap tensioning is distinctly different than for the two methods described for the first embodiment. Even though the head 367 is shown pivoted, it is understood that it can be provided with rectilinear motion instead by supporting the head 367 in grooves which would guide the head through reciprocal movement toward and away from the package in these grooves as an actuating cylinder, such as 367, is provided for its actuation. The function of the switch S12 would then still be identical for initiating the second stage of the tensioning operation.

Although particular embodiments of the invention have been shown and described it should be understood that the invention can be varied considerably without departing from the true scope of the appending claims.

We claim:

1. The combination in a strapping machine, of means for forming a seal, means for feeding a length of strap, means for holding the ends of the length of strap overlapping each other, means frictionally driven by the strap as it is fed to feed the seal from seal forming position to a joint forming position in the path of the overlapping strap ends.

2. The combination in a strapping machine, of means for forming a seal, means for feeding a length of strap, means for holding the ends of the length of strap overlapping each other, means frictionally driven by the strap as it is fed to feed the seal from seal forming position to a joint forming position in the path of the overlapping strap ends, and means for deforming the seal and the strap ends to provide an interlocking joint.

3. The combination in a strapping machine, of means for feeding a length of strap, means for holding the ends of the length of strap overlapping each other after it is fed, means frictionally driven by the strap as it is fed to feed a seal from a first position to a joint forming position in the path of the overlapping strap ends.

4. The combination in a strapping machine, of means for feeding a length of strap, means for holding the ends of the length of strap overlapping each other after it is fed, a seal feed bar frictionally driven by the strap as it is fed to feed a seal from a first position to a joint forming position in the path of the overlapping strap ends.

5. The combination in a strapping machine, of means for feeding a length of strap, means for holding the ends of the length of strap overlapping each other after it is fed, a seal feed bar biased against and frictionally driven by the strap and engaging a seal to feed the seal from a first position to a second position in the path of the overlapping strap ends upon feeding of the strap.

6. The combination in a strapping machine, of means for feeding a length of strap, means for holding the ends of the length of strap overlapping each other after it is fed, one surface of the strap being contacted with a seal feed bar having a spring biased free wheeling roller pressing the bar against the strap, the other surface of the strap being backed by a fixed anvil, one end of the seal feed bar engaging a seal to feed the seal from a first position to a second position in the path of the overlapping strap ends upon feeding of the strap as the strap drives the seal feed bar by means of friction created between the seal feed bar and the strap due to the pressure of the roller.

7. The combination in a strapping machine, of means for feeding a length of strap from a strap supply, means for holding both the supply end and the leading end of the length of strap overlapping each other after the strap is fed and formed into a strap loop, a fixed anvil interposed between the overlapping strap ends to act as a backing for one surface of the supply strap end, means for forming a seal from a seal blank into a channel shape over the fixed anvil, the opposite surface of the supply strap portion being contacted with a seal feed bar pressed against it by means of a spring biased free wheeling roller, one end of the seal feed bar engaging the seal to feed the seal from where it is formed to another position in the path of the overlapping strap ends upon the feeding of the strap as the strap frictionally drives the seal feed bar by the friction created between the strap and the seal feed bar by the pressure of the free wheeling roller.

8. The combination in a strapping machine, of means for feeding a length of strap from a strap supply, means for holding both the supply end and the leading end of the length of strap overlapping each other after the strap is fed and formed into a strap loop, a fixed anvil interposed between the overlapping strap ends to act as a backing for one surface of the supply strap end, means for forming a seal from a seal blank into a channel shape over the fixed anvil, the opposite surface of the supply strap portion being contacted with a seal feed bar pressed against it by means of a spring biased free wheeling roller, one end of the seal feed bar engaging the seal to feed the seal from where it is formed to another position in the path of the overlapping strap ends upon the feeding of the strap as the strap frictionally drives the seal feed bar by the friction created between the strap and the seal feed bar by the pressure of the free wheeling roller, and means for deforming the seal and the strap ends to provide an interlocking joint.

9. The combination in a strapping machine, of means for feeding a length of strap from a strap supply, means for holding both the supply end and the leading end of the length of strap overlapping each other after the strap is fed and formed into a strap loop, a fixed anvil interposed between the overlapping strap ends to act as a backing for one surface of the supply strap end, means for forming a seal from a seal blank into a channel shape over the fixed anvil, the opposite surface of the supply strap portion being contacted with a seal feed bar pressed against it by means of a spring biased free wheeling roller, one end of the seal feed bar engaging the seal to feed the seal from where it is formed to another position in the path of the overlapping strap ends upon the feeding of the strap as the strap frictionally drives the seal feed bar by the friction created between the strap and the seal feed bar by the pressure of the free wheeling roller, joint forming means for deforming the seal and the strap ends to provide an interlocking joint, and shear means adjacent the joint forming means acting in cooperation with one end of the fixed anvil to shear the strap loop from the strap supply.

10. The combination in a strapping machine, of means for feeding a length of strap from a strap supply, means for holding both the supply end and the leading end of the length of strap overlapping each other after the strap is fed and formed into a strap loop, a fixed anvil interposed between the overlapping strap ends to act as a backing for one surface of the supply strap end and provided with marginal flanges for guiding the supply strap end, means for forming a seal blank into a channel shape over the fixed anvil, the opposite surface of the supply strap portion being contacted with a seal feed bar pressed against it by means of a spring biased free wheeling roller, one end of the seal feed bar engaging the seal to feed the seal from where it is formed to another position in the path of the overlapping strap ends upon the feeding of the strap as the strap frictionally drives the seal feed bar by the friction created between the strap and the seal feed bar by the pressure of the free wheeling roller.

11. The combination in a strapping machine, of means for feeding a length of strap, means for holding the ends of the length of strap overlapping each other after it is fed, a fixed anvil interposed in the path of travel of the strap along one surface of the strap, a seal feed bar biased against the opposite strap surface and frictionally driven by the stray and engaging a seal to feed the seal longitudinally of the fixed anvil from a first position on the fixed anvil to a second position beyond the anvil in the path of the overlapping strap ends upon feeding of the strap.

12. The combination in a strapping machine, of means for feeding a length of strap, means for holding the ends of the length of strap overlapping each other after it is fed, a fixed anvil interposed in the path of travel of the strap along one surface of the strap, a seal feed bar biased against the opposite strap surface and frictionally driven by the strap and engaging a seal to feed the seal longitudinally of the fixed anvil from a first position on the fixed anvil to a second position beyond the anvil in the path of the overlapping strap ends upon feeding of the strap, and means for deforming the seal and strap ends to provide an interlocking joint.

13. The combination in a strapping machine, of means for feeding a length of strap, means for holding the ends of the length of strap overlapping each other after it is fed, a fixed anvil interposed in the path of travel of the strap along one surface of the strap, a seal feed bar biased against the opposite strap surface and frictionally driven by the strap and engaging a seal to feed the seal longitudinally of the fixed anvil from a first position on the fixed anvil to a second position beyond the anvil in the path of the overlapping strap ends upon feeding of the strap, means for deforming the seal and the strap ends to provide an interlocking joint, and shear means adjacent the joint forming means acting in cooperation with one end of the fixed anvil to shear the strap loop from the strap supply.

14. The combination in a strapping machine, of means for feeding a length of strap, means for holding the ends of the length of strap overlapping each other after it is fed, a fixed anvil interposed in the path of travel of the strap along one surface of the strap, means for forming a seal from a blank into a channel shape over the fixed anvil, a seal feed bar biased against the opposite strap surface and frictionally driven by the strap and engaging a seal to feed the seal longitudinally of the fixed anvil from a first position on the fixed anvil to a second position beyond the anvil in the path of the overlapping strap ends upon feeding of the strap.

15. The combination in a strapping machine, of means for feeding a length of binder strap into a strap loop with both the leading and supply ends of the length of strap overlapping each other and thereafter contracting said strap loop, a fixed anvil interposed in the path of travel of the strap between the paths of the overlapping strap ends, the anvil being provided with recesses at its lateral margins, and retractable gripping means for gripping the leading strap end against the anvil while deforming its lateral margins into the recesses of the anvil to thereby hold the leading strap end stationary while contracting said loop.

16. The combination in a strapping machine, of means for feeding a length of strap into a strap loop with both the leading and supply ends of the length of strap overlapping each other, a fixed anvil interposed in the path of travel of the strap between the paths of the overlapping strap ends and backing one surface of the supply end of the strap, the anvil being provided with recesses at its lateral margins, and retractable gripping means for gripping the leading strap end against the anvil while deforming its lateral margins into the recesses of the anvil, a seal feed bar biased against the opposite surface of the supply end of the strap and frictionally driven by the strap and engaging a seal to feed the seal longitudinally of the fixed anvil from a first position on the fixed anvil to a second position beyond the anvil in the path of the overlapping strap ends upon the feeding of the strap.

17. The combination in a strapping machine, of means for feeding a length of strap into a strap loop with both the leading and supply ends of the length of strap overlapping each other, a fixed anvil interposed in the path of travel of the strap between the paths of the overlapping strap ends and backing one surface of the supply end of the strap, the anvil being provided with recesses at its lateral margins, and retractable gripping means for gripping the leading strap end against the anvil while deforming its lateral margins into the recesses of the anvil, a seal feed bar biased against the opposite surface of the supply end of the strap and frictionally driven by the strap and engaging a seal to feed the seal longitudinally of the fixed anvil from a first position on the fixed anvil to a second position beyond the anvil in the path of the overlapping strap ends upon the feeding of the strap, means for deforming the seal and the strap ends to provide an interlocking joint, and shear means adjacent the joint forming means acting in cooperation with one end of the fixed anvil to shear the strap loop from the strap supply.

18. The combination in a strapping machine, of means for feeding a length of strap into a strap loop with both the leading and supply ends of the length of strap overlapping each other, a fixed anvil interposed in the path of travel of the strap between the paths of the overlapping strap ends along one surface of the supply end of the strap, the anvil being provided with recesses at its lateral margins, retractable gripping means for gripping the leading strap end against the anvil while deforming its lateral margins into the recesses of the anvil, means for forming a seal from a blank into a channel shape over the fixed anvil, a seal feed bar biased against the opposite surface of the supply end of the strap and frictionally driven by the strap and engaging a seal to feed the seal longitudinally of the fixed anvil from a first position on the fixed anvil to a second position beyond the anvil in the path of the overlapping strap ends upon feeding of the strap.

19. The combination in a strapping machine, a frame, of means for feeding a length of binder strap into a loop about an object with the leading end and the supply end overlapping each other, jaws for gripping the leading end of said strap, tensioning means for withdrawing the supply strap end from the gripped leading strap end, said jaws being mounted on a first block movable on the frame for actuation of the jaws, a second block movable on the frame adjacent the first block for actuating a means for forming a joint between the overlapping strap ends, the first block being provided with a pin slidable therethrough for alternate engagement and disengagement with a projection on the second block, a projection on the frame restricting the movement of the pin to hold it in engagement with the projection on the second block for the first portion of the forward stroke of the second block in order to cause the second block to drive the first block for that portion of its forward stroke, the projection on the second block camming the pin out of engagement with it as the pin clears the projection on the frame to thereby remove the driving connection between the two blocks during the second portion of the forward stroke of the second block.

20. The combination in a strapping machine, a frame, of means for feeding a length of binder strap into a loop about an object with the leading end and the supply end overlapping each other, jaws for gripping the leading end of said strap, tensioning means for withdrawing the supply strap end from the gripped leading strap end, said jaws being mounted on a first block movable on the frame for actuation of the jaws, a second block movable on the frame adjacent the first block for actuating a means for forming a joint between the overlapping strap ends, the first block being provided with a pin slidable therethrough for alternate engagement and disengagement with a projection on the second block, a projection on the frame restricting the movement of the pin to hold it in engagement with the projection on the second block for the first portion of the forward stroke of the second block in order to cause the second block to drive the first block for that portion of its forward stroke, the projection on the second block camming the pin out of engagement with it as the pin clears the projection on the frame to thereby remove the driving connection between the two blocks during the second portion of the forward stroke of the second block, the projection on the frame camming the pin back into the path of engagement with the projection on the second block upon the return stroke of the second block.

21. The combination in a strapping machine, a frame, of means for feeding a length of binder strap into a loop about an object with the leading end and the supply end overlapping each other, jaws for gripping the leading end of said strap, tensioning means for withdrawing the supply strap end from the gripped leading strap end, said jaws being mounted on a first block movable on the frame for actuation of the jaws, a second block movable on the frame adjacent the first block for actuating a means for forming a joint between the overlapping strap ends, the first block, being provided with a pin slidable therethrough for alternate engagement and disengagement with a projection on the second block, a projection on the frame restricting the movement of the pin to hold it in engagement with the projection on the second block for the first portion of the forward stroke of the second block in order to cause the second block to drive the first block for that portion of its forward stroke, the projection on the second block camming the pin out of engagement with it as the pin clears the projection on the frame to thereby remove the driving connection between the two blocks during the second portion of the forward stroke of the second block, the projection on the frame camming the pin back into the path of engagement with the projection on the second block upon the return stroke of the second block, the first block being provided with a third projection engaged by the projection on the second block to drive the first block on its return stroke.

22. The combination in a strapping machine, a frame, of means for feeding a length of binder strap into a loop about an object with the leading strap end and the supply strap end of the strap overlapping each other, jaws for gripping the leading end of the strap, tensioning means for withdrawing the supply strap end from the gripped leading strap end, said jaws being mounted on a first block movable on the frame for actuation of the jaws, a second block movable on the frame adjacent the first block for actuating a means for forming a joint between the overlapping strap ends, the first block being provided with retractable means for alternate engagement and disengagement with the second block, the frame restricting the movement of the retractable means to hold it in engagement with the second block for the first portion of the forward stroke of the second block in order to cause the second block to drive the first block for that portion of its forward stroke, the second block causing the disengagement with it of the retractable means to thereby remove the driving connection between the two blocks during the second portion of the forward stroke of the second block 23. The combination in a strapping machine, a frame, of means for feeding a length of binder strap into a loop about an object with the leading strap end and the supply strap end of the strap overlapping each other, jaws for gripping the leading end of the strap, tensioning means for withdrawing the supply strap end from the gripped leading strap end, said jaws being mounted on a first block movable on the frame for actuation of the jaws, a second block movable on the frame adjacent the first block for actuating a means for forming a joint between the overlapping strap ends, the first block being provided with retractable means for alternate engagement and disengagement with the second block, the frame restricting the movement of the retractable means to hold it in engagement with the second block for the first portion of the forward stroke of the second block in order to cause the second block to drive the first block for that portion of its forward stroke, the second block causing the disengagement with it of the retractable means to thereby remove the driving connection between the two blocks during the second portion of the forward stroke of the second block, the frame causing the retractable means to reengage the second block upon the return stroke of the second block 24. The combination in a strapping machine, a frame, of means for feeding a length of binder strap into a loop about an object with the leading strap end and the supply strap end of the strap overlapping each other, jaws for gripping the leading end of the strap, tensioning means for withdrawing the supply strap end from the gripped leading strap end, said jaws being mounted on a first block movable on the frame for actuation of the jaws, a second block movable on the frame adjacent the first block for actuating a means for forming a joint between the overlapping strap ends, the first block being provided with retractable means for alternate engagement and disengagement with the second block, the frame restricting the movement of the retractable means to hold it in engagement with the second block for the first portion of the forward stroke of the second block in order to cause the second block to drive the first block for that portion of its forward stroke, the second block causing the disengagement with it of the retractable means to thereby remove the driving connection between the two blocks during the second portion of the forward stroke of the second block, the frame causing the retractable means to reengage the second block upon the return stroke of the second block, the first block contacting the second block to drive the first block on its return stroke.

25. The combination in a strapping machine, comprising, a frame, an anvil, means for shearing a blank from a strip of seal stock and forming it into a channel shape over the anvil, said means comprising a former block provided with two parallel formers for forming the blank into its channel shape, and a block slidable between the two parallel formers, the block being loosely secured to the frame by means of a pin fastened to the frame and passing through an opening in the block of larger size than the diameter of the pin to provide an amount of free movement of the block relative to the frame equal to the difference between the diameter of the pin and the size of the opening, the block ordinarily being resiliently biased against the pin to keep the block retracted, the two parallel formers causing the block to move forward relative to the pin upon the forward stroke of the formers.

26. The combination in a strapping machine comprising, a frame, an anvil, means for shearing a blank from a strip of seal stock and forming it into a channel shape over the anvil, said means comprising a former block provided with parallel formers for forming the blank into its channel shape, a block slidable between the parallel formers, the block being loosely secured to the frame by means of pin fastened to the frame and passing through an opening in the block of larger size than the diameter of the pin to provide an amount of free movement of the block relative to the frame equal to the difference between the diameter of the pin and the size of the opening, the block being resiliently biased against the pin to ordinarily keep the block retracted, the parallel formers causing the block to move forward relative to the pin upon the forward stroke of the formers, as a part connected to at least one of the formers contacts a resilient pad mounted on the block.

27. The combination in a strapping machine, of means for forming a seal, means for gripping the leading end of a loop of strap fed from a strap supply and encircled about an object, means for contracting the loop of strap about the object, means for forming an interlocking joint between the ends of the strap loop, means for shearing the loop of strap from the strap supply, and a single driving means connected to drive the joint forming means which in turn drives the seal forming means, the strap gripping means, and the shearing means, said single driving means comprising a fluid operated piston.

28. The combination in a strapping machine, of means for forming a seal, means for gripping the leading end of a loop of strap fed from a strap supply and encircled about an object, means for contracting the loop of strap about the object, means for forming an interlocking joint between the ends of the strap loop, means for shearing the loop of strap from the strap supply, and a single driving means connected to drive the joint forming means which in turn drives the seal forming means, the strap gripping means, and the shearing means, said single driving means comprising a fluid operated piston contained in a cylinder pivoted at its piston end to the frame of the machine, said piston being connected to drive the joint forming means by means of a first link pivotally connected between them, said first link being pivotally connected at an intermediate point to a second link pivotally connected to said frame.

29. The combination in a strapping machine, of gripping means for gripping the leading end of a loop of strap encircled about an object, forming means for forming an interlocking joint between the ends of the strap loop, and driving means for moving the forming means forward in two stages, the forming means having releasable means engaged with the gripping means for driving the gripping means to grip said leading end of said loop of strap during the first stage movement of the forming means, and thereafter the forward movement of said forming means causing said releasable means to cause the forming means to become disengaged from the gripping means and actuated to form a joint during the second stage movement without further actuation of the gripping means.

30. The combination in a strapping machine, of gripping means for gripping the leading end of a loop of strap encircled about an object, forming means for forming an interlocking joint between the ends of the strap loop, and driving means for moving the forming means forward in two stages, the forming means having releasable means engaged with the gripping means for driving the gripping means to grip said leading end of said loop of strap during the first stage movement of the forming means, and thereafter the forward movement of said forming means causing said releasable means to cause the forming means to become disengaged from the gripping means at approximately the start of the second stage movement and actuated to form a joint during the second stage movement without further actuation of the gripping means.

31. The combination in a strapping machine, of gripping means for gripping the leading end of a loop of strap encircled about an object, forming means for forming an interlocking joint between the ends of the strap loop, and driving means for moving the forming means forward in two stages, the forming means having releasable means engaged with the gripping means for driving the gripping means to grip the leading end of said strap during the first stage movement of the forming means, the forward movement of said forming means causing said releasable means to cause the forming means to become disengaged from the gripping means at approximately the end of the first stage of movement and actuated to form a joint during the second stage movement without further actuation of the gripping means.

32. The combination in a strapping machine, of gripping means for gripping the leading end of a loop of strap encircled about an object, forming means for forming an interlocking joint between the ends of the strap loop, and fluid driving means for moving the forming means forward in two stages, a disengageable connection between the forming means and the gripping means provided to cause the forming means to actuate the gripping means to a strap gripping position during the first stage of movement, the forward movement of said forming means causing said connection to become disengaged to release the gripping means from the forming means during the second stage of movement during which the gripping means remains in strap gripping position and the forming means is actuated to form a joint, said fluid driving means being connected to a fluid metering device for supplying a fixed volume of pressurized fluid to the fluid driving means to limit the travel of said fluid driving means during its first stage of movement.

33. The combination in a strapping machine, of gripping means for gripping the leading end of a loop of strap encircled about an object, forming means for forming an interlocking joint between the ends of the strap loop, and fluid driving means for moving the forming means forward in two stages, a driving connection provided between the forming means and the gripping means to cause the forming means to actuate the gripping means to a strap gripping position during the first stage of movement, the forward movement of said forming means causing said connection to become disconnected to release the gripping means from the forming means and maintain the gripping means in a strap gripping position while the forming means is actuated to form a joint during the second stage of movement, said fluid driving means comprising a cylinder containing a pressurized fluid operated piston connected to drive the forming means, said cylinder being supplied with a fixed volume of pressurized fluid from a fluid metering cylinder for moving the forming means forward during its first stage of movement by a distance in proportion to said fixed volume.

34. The combination in a strapping machine, of gripping means for gripping the leading end of a loop of strap encircled about an object, forming means for forming an interlocking joint between the ends of the strap loop, and fluid driving means for moving the forming means forward in two stages, a driving connection provided between the forming means and the gripping means to cause the forming means to actuate the gripping means to a strap gripping position during the first stage of movement, the forward movement of said forming means causing said connection to become disconnected to release the gripping means from the forming means and maintain the gripping means in a strap gripping position while the forming means is actuated to form a joint during the second stage of movement, said fluid driving means comprising a cylinder containing a pressurized fluid operated piston connected to drive the forming means, said cylinder being supplied with a fixed volume of pressurized fluid from a fluid metering cylinder for moving the forming means forward during its first stage of movement by a distance in proportion to said fixed volume, said first mentioned cylinder being connected to a valve actuated to provide pressurized fluid from a main pressure source to cause the forming means to move forward for its second stage of movement.

35. The combination in a strapping machine, of gripping means for gripping the leading end of a loop of strap encircled about an object, forming means for forming an interlocking joint between the ends of the strap loop, and fluid driving means for moving the forming means forward in two stages, a driving connection provided between the forming means and the gripping means to cause the forming means to actuate the gripping means to a strap gripping position during the first stage of movement, the forward movement of said forming means causing said connection to become disconnected to release the gripping means from the forming means and maintain the gripping means in strap gripping position while the forming means is actuated to form a joint during the second stage of movement, said fluid driving means comprising a cylinder containing a pressurized fluid operated piston connected to drive the forming means, said cylinder being supplied with a fixed volume of pressurized fluid from a fluid metering cylinder for moving the forming means forward during its first stage of movement by a distance in proportion to said fixed volume, said first mentioned cylinder being connected to a valve actuated to provide pressurized fluid from a main pressure source to cause the forming means to move forward for its second stage of movement, and electrical means for controlling the operation of the valve.

36. The combination in a strapping machine, of means for feeding a length of strap into a closed strap loop about an object, means for gripping the leading end of the strap and single tension means for withdrawing the supply end of the strap to remove the slack in the strap and tighten the strap loop onto the object, the tension means being powered by means of a hydraulic motor simultaneously supplied with pressurized fluid from two sources, means for shutting off the flow from one of the sources to the hydraulic motor in response to a predetermined tension reached in the strap.

37. The combination in a strapping machine, of means for gripping the leading end of a loop of strap encircled about an object, tension means for withdrawing the supply end of the strap to contract the loop and tension it on the object, the tension means being powered by means of a fluid powered driving unit simultaneously supplied with fluid from two sources, means for shutting off the flow from one of the sources to the hydraulic unit in response to a predetermined tension reached in the strap.

38. The combination in a strapping machine, of means for gripping the leading end of a loop of strap encircled about an object, tension means for withdrawing the supply end of the strap to contract the loop and tension it on the object, the tension means being driven by means of a hydraulic motor simultaneously supplied with fluid from two pumps, means for shutting off the flow from one of the pumps to the hydraulic motor in response to a predetermined tension reached in the strap.

39. In a strapping machine of a type having tension means for contracting and tensioning a strap loop onto an object, comprising, a strap tensioning hydraulic motor simultaneously supplied with fluid from both a low pressure high volume pump and a high pressure low volume pump to provide maximum fluid flow to the hydraulic motor during the initial slack take-up period of strap tensioning to provide maximum strap take-up speed, a fluid reservoir, a pressure relief type valve connected between the reservoir and the low pressure high volume pump, a fluid connection between the outlet side of the high pressure low volume pump and the pressure relief type valve for transmitting fluid pressure from the outlet side to the valve, the valve being adjusted to open when the fluid in the outlet side reaches a predetermined pressure as created by the tension reached in the strap to divert the fluid flow from the low pressure high volume pump through the valve to the fluid reservoir, to reduce the fluid flow to the hydraulic motor and thereby slow down the strap take-up speed during final stages of strap tensioning.

40. In a strapping machine of a type having tension means for contracting and tensioning a strap loop onto an object, comprising, a strap tensioning hydraulic motor simultaneously supplied with fluid from both a low pressure high volume pump and a high pressure low volume pump to provide maximum fluid flow to the hydraulic motor during the initial slack take-up period of strap tensioning to provide maximum strap take-up speed, a fluid reservoir, a pressure relief type valve connected between the reservoir and the low pressure high volume pump, a fluid connection between the outlet side of the high pressure low volume pump and the pressure relief type valve for transmitting fluid pressure from the outlet side to the valve, the valve being adjusted to open when the fluid in the outlet side reaches a predetermined pressure as created by the tension reached in the strap to divert the fluid flow from the low pressure high volume pump through the valve to the fluid reservoir, to reduce the fluid flow to the hydraulic motor and thereby slow down the strap take-up speed during final stages of strap tensioning, a check valve being connected between the outlet sides of both pumps to prevent flow from the high pressure low volume pump through the valve.

41. The combination in a strapping machine, of means for gripping the leading end of a loop of strap positioned in a strap guide track encircled about an object, tension means for withdrawing the supply end of the strap to contract the loop and tension it on the object, the tension means being powered by a power unit simultaneously provided with energy from two sources, the power unit being disconnected from one of the sources by the actuation of means within the strap guide track upon removal of the strap from the track while the strap is being tensioned.

42. The combination in a strapping machine, of means for gripping the leading end of a loop of strap encircled about an object, tension means for withdrawing the supply end of strap to contract the loop and tension it on the object, the tension means being powered by a power unit simultaneously provided with energy from two sources, the power unit being disconnected from one of the sources in response to the strap tensioning reaching a predetermined value.

43. The combination in a strapping machine, of a frame, support means on the frame for supporting an object to be bound, a strapping head on the frame movable to and away from an object supported on the support means, means for gripping the leading end of a loop of strap encircled about the object, tension means for withdrawing the supply end of the strap to contract the loop and tension it on the object, the tension means being powered by a power unit simultaneously provided with energy from two sources, means actuated upon contact with the object being bound as the strapping head is moved toward the object to disconnect the power unit from one of the energy sources.

44. In a strapping machine of a type having tension means for contracting and tensioning a strap loop onto an object, comprising, a strap tensioning hydraulic motor supplied with fluid at its inlet, an electrical control circuit, the outlet of said motor being connected to an adjustable pressure relief valve, the setting of the valve determining the tension to be reached in the strap, the relief valve being connected at its outlet to a fluid pressure switch actuated by the fluid overflowing the valve as the fluid pressure in the motor builds up to the valve setting, the fluid pressure switch being embodied in the electrical control circuit so that its actuation initiates another operating means of the strapping machine.

45. In a strapping machine of a type having tension means for contracting and tensioning a strap loop onto an object, comprising, a strap tensioning hydraulic motor supplied with fluid at its inlet, an electrical control circuit, the outlet being connected to a first adjustable pressure relief valve, the setting of the valve determining the tension to be reached in the strap, the first pressure relief valve being connected at its outlet to a second pressure relief valve adjusted to maintain at its inlet a fluid pressure below the setting of the first pressure relief valve, a pressure switch positioned between the two valves which is actuated by the fluid overflowing the first pressure relief valve as the overflowing fluid builds up to a pressure below the setting of the second pressure relief valve, the fluid pressure switch being embodied in the electrical control circuit so that its actuation initiates another operating means of the strapping machine.

46. In a strapping machine of a type having tension means for contracting and tensioning a strap loop onto an object, comprising, a strap tensioning hydraulic motor supplied with fluid at its inlet, an electrical control circuit, the outlet being connected to a first adjustable pressure relief valve, the setting of the valve determining the tension to be reached in the strap, the first pressure relief valve being connected at its outlet to a second pressure relief valve adjusted to maintain at its inlet a fluid pressure below the setting of the first pressure relief valve, a pressure switch positioned between the two valves which is actuated by the fluid overflowing the first pressure relief valve as the overflowing fluid builds up to a pressure below the setting of the second pressure relief valve, the fluid pressure switch being embodied in the electrical control circuit so that its actuation initiates another operating means of the strapping machine, the second pressure relief valve being connected at its outlet to a fluid reservoir maintained at lower pressure than the setting of the second pressure relief valve, a restricted orifice bypass for the second valve of a sufficiently small opening to prevent the diminishing of fluid pressure at the inlet of the second pressure relief valve below its setting as long as fluid is supplied to it from the hydraulic motor, the orifice permitting a flow of fluid from the inlet side of the second pressure relief valve to the fluid reservoir, to reduce the fluid pressure below the setting of the valve after fluid flow through the hydraulic motor is blocked to thereby permit the pressure switch to reset in response to the reduced fluid pressure.

47. The combination in a strapping machine, of means for feeding a length of strap into a strap loop around an object to be bound with both the leading and supply ends of the length of strap overlapping each other, a fixed anvil of a type over which a seal is formed into a U-shape interposed in the path of travel of the strap between the paths of the overlapping strap ends, retractable gripping means for gripping the leading end of the strap against the anvil, tension means for retracting the supply strap end away from the leading strap end to contract the strap loop onto the object, joint forming means for forming a joint between the overlapping strap ends after tensioning is completed, and shear means reacting against the end of the anvil itself as a shear blade for shearing the strap loop from the strap supply, said retractable gripping means supporting the anvil to prevent its deflection during operation of the shear means.

48. The combination in a strapping machine, of means for providing a seal, means for feeding a length of strap, means for holding the ends of the length of strap overlapping each other, and means driven by the strap as it is fed to feed the seal from a first position to a joint forming position in the path of the overlapping strap ends.

49. The combination in a strapping machine, of means for providing a seal, means for feeding a length of strap, means for holding the ends of the length of strap overlapping each other, means driven by the strap as it is fed to feed the seal from a first position to a joint forming position in the path of the overlapping strap ends, and means for deforming the seal and the strap ends to provide an interlocking joint.

50. The combination in a strapping machine, of means for forming a seal, means for feeding a length of strap, means for holding the ends of the length of strap overlapping each other, and means driven by the strap as it is fed to feed the seal from seal forming position to a joint forming position in the path of the overlapping strap ends.

51. The combination in a strapping machine, of means for providing a seal, means for feeding a length of strap, means for holding the ends of the length of strap overlapping each other, and a driving connection between the strap and the seal to cause the strap to drive the seal from a first position to a joint forming position in the path of the overlapping strap ends.

References Cited in the file of this patent

UNITED STATES PATENTS

| | | |
|---|---|---|
| 1,805,791 | Treat | May 19, 1931 |
| 1,912,184 | Ferris et al. | May 30, 1933 |
| 1,982,711 | Vickers | Dec. 4, 1934 |
| 2,052,627 | Hermann | Sept. 1, 1936 |
| 2,136,225 | Williams | Nov. 8, 1938 |
| 2,194,108 | Wright | Mar. 19, 1940 |
| 2,205,647 | Ferris | June 25, 1940 |
| 2,468,768 | Malick | May 3, 1949 |
| 2,707,429 | Leslie et al. | May 3, 1955 |
| 2,764,082 | Saquet | Sept. 25, 1956 |
| 2,831,422 | Black et al. | Apr. 22, 1958 |
| 2,853,938 | Hall et al. | Sept. 30, 1958 |

FOREIGN PATENTS

| | | |
|---|---|---|
| 64,950 | France | July 27, 1955 |
| | (Addition to No. 1,064,611) | |
| 778,315 | Great Britain | July 3, 1957 |
| 833,572 | France | July 25, 1938 |